(12) United States Patent
Thangarasa et al.

(10) Patent No.: US 12,047,799 B2
(45) Date of Patent: Jul. 23, 2024

(54) RADIO LINK MONITORING

(71) Applicant: TELEFONAKTIEBOLAGET LM ERICSSON (PUBL), Stockholm (SE)

(72) Inventors: Santhan Thangarasa, Vällingby (SE); Muhammad Ali Kazmi, Sundbyberg (SE); Kazuyoshi Uesaka, Kawasaki (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 400 days.

(21) Appl. No.: 17/430,443

(22) PCT Filed: Feb. 13, 2020

(86) PCT No.: PCT/EP2020/053713
§ 371 (c)(1),
(2) Date: Aug. 12, 2021

(87) PCT Pub. No.: WO2020/165317
PCT Pub. Date: Aug. 20, 2020

(65) Prior Publication Data
US 2022/0210681 A1 Jun. 30, 2022

Related U.S. Application Data

(60) Provisional application No. 62/806,109, filed on Feb. 15, 2019.

(51) Int. Cl.
*H04W 56/00* (2009.01)
*H04W 24/10* (2009.01)
*H04W 4/70* (2018.01)
(52) U.S. Cl.
CPC ......... *H04W 24/10* (2013.01); *H04W 56/001* (2013.01); *H04W 4/70* (2018.02)

(58) Field of Classification Search
CPC ..... H04W 24/10; H04W 56/001; H04W 4/46; H04W 4/027; H04W 4/44; H04W 4/70; H04W 4/40
See application file for complete search history.

(56) References Cited

U.S. PATENT DOCUMENTS

2010/0118856 A1* 5/2010 Krishnamurthy ..... H04L 1/0026
370/350
2016/0183112 A1 6/2016 Yang et al.
(Continued)

FOREIGN PATENT DOCUMENTS

CN 104243099 A 12/2014
WO 2014/068535 A2 5/2014
(Continued)

OTHER PUBLICATIONS

Office Action dated Oct. 20, 2023 for Chinese Patent Application No. 202080029329.4, 11 pages (English translation provided).

*Primary Examiner* — Chi Ho A Lee
(74) *Attorney, Agent, or Firm* — Sage Patent Group

(57) ABSTRACT

A method performed by a wireless device for monitoring a radio link with a base station is disclosed. The method comprises performing a measurement on at least one reference signal received from a base station and converting a result of the measurement to a BLER of a hypothetical Downlink Control Channel transmission from the base station using a mapping. The method further comprises comparing the converted result to at least one threshold to determine whether the wireless device is in synchronization with the base station, triggering a measurement event on the basis of the comparison, and selecting, on the basis of the triggered measurement event, a mapping for use in a subsequent conversion of a measurement result. Also disclosed (Continued)

are a method performed by a base station, a wireless device, a user equipment and a base station.

17 Claims, 14 Drawing Sheets

(56) References Cited

U.S. PATENT DOCUMENTS

| | | | | |
|---|---|---|---|---|
| 2017/0230780 A1* | 8/2017 | Chincholi | ............... | H04L 43/16 |
| 2017/0318515 A1 | 11/2017 | Arora et al. | | |
| 2019/0089579 A1* | 3/2019 | Sang | ..................... | H04W 40/16 |
| 2019/0320469 A1* | 10/2019 | Huang | ............. | H04W 74/0833 |
| 2020/0146032 A1* | 5/2020 | Bae | ....................... | H04L 1/1819 |
| 2020/0274657 A1* | 8/2020 | Deenoo | ................ | H04L 1/0021 |
| 2020/0343995 A1* | 10/2020 | Shao | .................... | H04L 1/1819 |
| 2020/0389848 A1* | 12/2020 | Ji | ............................ | H04L 1/203 |
| 2021/0243923 A1* | 8/2021 | Hwang | ............... | H05K 7/2029 |

FOREIGN PATENT DOCUMENTS

| | | |
|---|---|---|
| WO | 2017/061939 A1 | 4/2017 |
| WO | 2018/174806 A1 | 9/2018 |

\* cited by examiner

RADIO LINK MONITORING

This application is a 371 of International Application No. PCT/EP2020/053713, filed Feb. 13, 2020, which claims the benefit of U.S. Provisional Application No. 62/806,109, filed Feb. 15, 2019, the disclosures of which are fully incorporated herein by reference.

TECHNICAL FIELD

The present disclosure relates to a method performed by a wireless device for monitoring a radio link with a base station. The present disclosure also relates to a method performed by a base station for facilitating monitoring of a radio link. The present disclosure also relates to a wireless device, a user equipment and a base station.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Machine Type Communication (MTC)

Machine-to-machine (M2M) communication (also known as machine type communication (MTC)) is used for establishing communication between machines and between machines and humans. The communication may comprise exchange of data, signaling, measurement data, configuration information etc. The device size may vary from that of a wallet to that of a base station. M2M devices are quite often used for applications like sensing environmental conditions (e.g. temperature reading), metering or measurement (e.g. electricity usage etc.), fault finding or error detection etc. In these applications the M2M devices are active very seldom but over a consecutive duration depending upon the type of service e.g. about 200 ms once every 2 seconds, about 500 ms every 60 minutes etc. An M2M device may also perform measurements on other frequencies or other Radio Access Technologies (RATs). An MTC or M2M device is expected to be of low cost and low complexity. A low complexity UE envisaged for M2M operation may implement one or more low cost features including smaller downlink and uplink maximum transport block size (e.g. 1000 bits) and/or reduced downlink channel bandwidth of 1.4 MHz for data channel (e.g. PDSCH). A low cost UE may also comprise a half-duplex (HD-FDD) and one or more of the following additional features: single receiver (1 Rx) at the UE, smaller downlink and/or uplink maximum transport block size (e.g. 1000 bits) and reduced downlink channel bandwidth of 1.4 MHz for data channel. The low cost UE may also be termed as low complexity UE.

RLM Procedure in LTE

The purpose of radio link monitoring (RLM) is to monitor the radio link quality of the serving cell of the UE and use that information to decide whether the UE is in in-sync or out-of-sync with respect to that serving cell. In LTE RLM is carried out by a UE performing measurements on downlink reference symbols (CRS) in RRC_CONNECTED state. If results of radio link monitoring indicate a number of consecutive out of sync (OOS) indications, then the UE starts Radio Link Failure (RLF) procedure and declares RLF after the expiry of RLF time (which may for example be T310 as described below). The actual RLM procedure is carried out by comparing the estimated downlink reference symbol measurements to some thresholds, Qout and Qin. Qout and Qin correspond to Block Error Rates (BLER) of hypothetical PDCCH/PCIFCH, ePDCCH or MPDCCH transmissions from the serving cell. Examples of the target BLER corresponding to Qout and Qin are 10% and 2% respectively. The radio link quality in RLM is performed based on Cell Specific Reference signals (CRS), at least once every radio frame (when not configured with Discontinuous Reception (DRX)) or periodically with DRX cycle (when configured with DRX), over the full cell bandwidth which is also the control channel bandwidth (e.g. PDCCH and PCFICH) for LTE UE, or over the UE bandwidth for MTC UEs (e.g., Cat-M1, Cat-M2 UE).

Upon start of the T310 timer or T313 timer as specified in clause 5.3.11 in TS 36.331 v14.4.0, the UE shall monitor the link of serving cell (e.g. PCell or PSCell) for recovery using the evaluation period and Layer 1 indication interval corresponding to the non-DRX mode until the expiry or stop of T310 timer or T313 timer. The transmitter power of the UE shall be turned off within 40 ms after expiry of T310 timer and the transmitter power of PSCell if configured shall be turned off within 40 ms after expiry of T313 timer as specified in clause 5.3.11 in TS 36.331. T310 is also called the RLF timer in that the RLF procedure starts upon triggering the RLF, which is triggered upon receiving N310 number of consecutive out-of-sync indications from its lower layers. When T310 expires then the RLF is declared. But T310 is reset upon receiving N311 number of consecutive in-sync indications from its lower layers. The network configured UE timers, T310 and T313, are specified in 36.331 v14.4.0 as follows:

| | | | |
|---|---|---|---|
| T310 NOTE1 NOTE2 | Upon detecting physical layer problems for the PCell i.e. upon receiving N310 consecutive out-of-sync indications from lower layers | Upon receiving N311 consecutive in-sync indications from lower layers for the PCell, upon triggering the handover procedure and upon initiating the connection re-establishment procedure | If security is not activated: go to RRC_IDLE else: initiate the connection re-establishment procedure |
| T313 NOTE2 | Upon detecting physical layer problems for the | Upon receiving N314 consecutive in-sync indications from lower | Inform E-UTRAN about the SCG radio link failure by initiating the SCG failure |

-continued

| PSCell i.e. upon receiving N313 consecutive out-of-sync indications from lower layers | layers for the PSCell, upon initiating the connection re-establishment procedure, upon SCG release and upon receiving RRCConnectionReconfiguration including MobilityControlInfoSCG | information procedure as specified in 5.6.13. |
|---|---|---|

NOTE1:
Only the timers marked with "NOTE1" are applicable to NB-IoT.
NOTE2:
The behaviour as specified in 7.3.2 applies The timers are configured by means of signaling e.g. RRC signaling. The timers can have values: 0, 50 ms, 100 ms, 200 ms, 500 ms, 1000 ms and 2000 ms.

MPDCCH

In 3GPP, MTC UEs need to monitor the MTC UE specific control channel, called MPDCCH. MPDCCH transmits the downlink control information (DCI) for MTC UEs which indicates the MTC UE specific information such as PDSCH repetition number or used narrowband(s) as well as Modulation Coding Scheme (MCS) and transmission mode. When 3GPP specified MTC in Rel-13, MPDCCH is based on the LTE EPDCCH and it uses the demodulation reference signal (DMRS) for demodulation.

There currently exist certain challenge(s). MTC UEs can operate under different coverage levels which are also known as normal coverage/CEModeA and enhanced coverage/CEModeB. A UE performs different types of measurements while in RRC_CONNECTED state when operating in the different coverage modes. The RLM procedure is carried out based on CRS based SNR measurement. The accuracy of such measurement depends on the coverage level configured or experienced by the UE. Generally, the measurement accuracy decreases with increased coverage level, and therefore the measurement accuracy requirements are also more relaxed under extended overage. This is because UE in extended coverage level is located on lower SNR condition and in such a condition, the measurement accuracy is significantly worse than in normal coverage level. For example, RSRP absolute measurement in CEModeA and in CEmodeB is required to be accurate within ±7 dB and ±10 dB respectively. This means the measurement that is used for RLM evaluation can be subject to high bias and can degrade the network performance since network node may adapt the transmission parameters based on the RLM evaluation result. It would therefore be desirable to improve the RLM performance.

Certain aspects of the present disclosure and their embodiments may provide solutions to these or other challenges. It is an object of the present disclosure to provide methods, a wireless device and a base station which at least partially address one or more of the challenges discussed above.

SUMMARY

According to some examples of the present disclosure, two modes are envisaged for performing RLM, each mode having a specific mapping for converting a measured signal quality to a BLER of a hypothetical control channel transmission. The mapping for the first mode assumes that a measured reference signal has been transmitted using Radio Link Monitoring Transmission Parameters (RTPs) associated with a control channel configuration based on at least two reference signals. The mapping for the second mode assumes that a measured reference signal has been transmitted using Radio Link Monitoring Transmission Parameters (RTPs) associated with a control channel configuration based on only one reference signal.

According to examples of the present disclosure, the RLM mode, and hence the mapping to be used for converting a measurement result for signal quality to a BLER of a hypothetical control channel transmission, is selected by the UE on the basis of a type of measurement event reported by the UE. If the type of measurement reported by the UE indicates that the radio link can be relatively reliably received by the UE, then the UE selects the second mode of RLM, and a mapping based on a control channel transmitted using RTPs based on a single reference signal. If the type of measurement reported by the UE indicates that the radio link cannot be relatively reliably received by the UE, then the UE selects the first mode of RLM, and a mapping based on a control channel transmitted using RTPs based on at least two reference signals. A network node may similarly adjust the RTPs with which the control channel is transmitted to a UE based on a type of a measurement event reported by the UE to the network node.

The present disclosure provides methods to be performed in a wireless device such as a UE, which may be an M2M type UE, and in a network node such as a base station. The present disclosure also provides a wireless device, a user equipment and a base station.

According to a first aspect of the present disclosure, there is provided a method performed by a wireless device for monitoring a radio link with a base station. The method comprises performing a measurement on at least one reference signal received from a base station, converting a result of the measurement to a Block Error Rate, BLER, of a hypothetical Downlink Control Channel transmission from the base station using a mapping and comparing the converted result to at least one threshold to determine whether the wireless device is in synchronization with the base station. The method further comprises triggering a measurement event on the basis of the comparison, and selecting, on the basis of the triggered measurement event, a mapping for use in a subsequent conversion of a measurement result.

According to another aspect of the present disclosure, there is provided a method performed by a wireless device for monitoring a radio link with a base station. The method comprises performing a measurement on a first type of reference signal received from a base station, reporting a measurement event on the basis of the measurement, and selecting, on the basis of the reported measurement event, whether to monitor the radio link with the base station using only the first type of reference signal, or both the first type of reference signal and a second type of reference signal.

According to another aspect of the present disclosure, there is provided a method performed by a base station for facilitating monitoring of a radio link, the method comprising receiving a measurement event from a wireless device, and selecting, on the basis of the received measurement event, transmission parameters for a transmission to the wireless device.

According to another aspect of the present disclosure, there is provided a wireless device for monitoring a radio link with a base station. The wireless device comprises processing circuitry and power supply circuitry configured to supply power to the wireless device. The processing circuitry is configured to perform a measurement on at least one reference signal received from a base station, convert a result of the measurement to a Block Error Rate, BLER, of a hypothetical Downlink Control Channel transmission from the base station using a mapping and compare the converted result to at least one threshold to determine whether the wireless device is in synchronization with the base station. The processing circuitry is further configured to trigger a measurement event on the basis of the comparison, and select, on the basis of the triggered measurement event, a mapping for use in a subsequent conversion of a measurement result.

According to another aspect of the present disclosure, there is provided a base station for facilitating monitoring of a radio link. The base station comprises processing circuitry and power supply circuitry configured to supply power to the base station. The processing circuitry is configured to receive a measurement event from a wireless device and select, on the basis of the received measurement event, transmission parameters for a transmission to the wireless device.

According to another aspect of the present disclosure, there is provided a user equipment (UE) for monitoring a radio link with a base station. The UE comprises an antenna configured to send and receive wireless signals and radio front-end circuitry connected to the antenna and to processing circuitry, and configured to condition signals communicated between the antenna and the processing circuitry. The processing circuitry is configured to perform a measurement on at least one reference signal received from a base station, convert a result of the measurement to a Block Error Rate, BLER, of a hypothetical Downlink Control Channel transmission from the base station using a mapping and compare the converted result to at least one threshold to determine whether the wireless device is in synchronization with the base station. The processing circuitry is further configured to trigger a measurement event on the basis of the comparison, and select, on the basis of the triggered measurement event, a mapping for use in a subsequent conversion of a measurement result. The UE further comprises an input interface connected to the processing circuitry and configured to allow input of information into the UE to be processed by the processing circuitry, an output interface connected to the processing circuitry and configured to output information from the UE that has been processed by the processing circuitry, and a battery connected to the processing circuitry and configured to supply power to the UE.

Examples of the present disclosure envisage a UE served by a serving cell (cell1), which is managed or served by a first network node (NW1). The UE can trigger a first set of events (E1) related to RLM and a second set of events (E2) related to RLM.

According to a first example of the present disclosure, the UE upon triggering at least one second type of events, monitors the lower layers of signals in cell1 based on a second set of RLM transmission parameters (RTP2). RTP2 is associated with only one type of reference signals (RS1 or RS2) transmitted by cell1. According to another example of the present disclosure, the UE upon triggering at least one first type of events, monitors the lower layers of signals in cell1 based on a first set of RLM transmission parameters (RTP1). RTP1 is associated with both RS1 and another type of reference signals (RS2), which are transmitted by cell1. Examples of RS1 and RS2 are Cell Specific Reference Signals (CRS) and Demodulation Reference Signals (DMRS) respectively. Examples of events in the second set of events E2 are events corresponding to a reference signal measurement being above thresholds Qin, earlyQin etc, and so indicating that the UE is in synchronization with the base station. Examples of events in the first set of events E1 are events corresponding to a reference signal measurement being below thresholds Qout, earlyQout etc and so indicating that the UE is not in synchronization with the base station. The set of RTP1 and RTP2 can be pre-defined or can be configured by the network node.

According to another example of the present disclosure, the first network node (NW1) upon receiving results of a first set of events (E1) related to RLM or a second set of events (E2) related to RLM, adapts the RLM transmission parameters in cell. If the received results indicate that the UE has triggered E1 then NW1 adapts transmission of signals in cell1 based on RTP1. But if the received results indicate that the UE has triggered E2 then NW1 adapts transmission of signals in cell1 based on RTP2.

The first examples are related to a wireless device (e.g. UE), and can be summarized as UE monitoring the lower layer (or physical layer) for certain type of events associated with RLM (e.g. passing thresholds earlyQout, Qin) with respect to the serving cell (cell1), and adapting the RLM procedure based on that event. Adapting of RLM procedure herein means, the UE uses CRS or DMRS based quality (e.g. SNR) measurement for triggering of the RLM events, but it selects a mapping table to derive the hypothetical BLER of the control channel based on the type of event that was triggered. If the event was an E2 event, indicating the downlink radio link can be reliably received, then the UE selects a mapping table which depends only on one type of reference signal e.g. CRS. If the event was an E1 event, indicating that the downlink radio link cannot be reliably received, the UE uses a mapping table which depends on both DMRS and CRS to derive the hypothetical BLER of the control channel, see Table 4. In addition, following triggering of an E1 event, the UE uses a set of transmission parameters for out-of-sync event and in-sync, which are associated with both DMRS and CRS transmission in cell1, as shown in Table 1 and Table 2 below. These transmission parameters are called herein as a first set of out of sync transmission parameters. In 3GPP Release 16, it is intended to improve MPDCCH demodulation performance by using cell-CRS in addition to DMRS. This means the UE can use both DMRS and CRS for channel estimation, and it could improve the MPDCCH decoding performance especially in low SNR condition.

TABLE 1

MPDCCH transmission parameters for
UE category M1 with CE mode A

| Attribute | in-sync | out-of-sync |
|---|---|---|
| Power ratio of MPDCCH DMRS to CRS | −3 dB | −3 dB |
| Codebook index (NOTE 3) | 0 | 0 |
| Maximum M-PDCCH repetition level | $R_{max}^{Note1}$ | $R_{max}^{Note1}$ |

TABLE 1-continued

MPDCCH transmission parameters for
UE category M1 with CE mode A

| Attribute | in-sync | out-of-sync |
|---|---|---|
| Aggregation level (ECCE) | $L'_{max}$ Note2 | $L'_{max}$ Note2 |
| MPDCCH Transmission type | Distributed | Distributed |

Note1
$R_{max}$ is determined by the configurable parameter mPDCCH-NumRepetition defined in 36.331 and $R_{max} > 1$.
Note2
$L'_{max}$ and $L'_{max-2}$ is derived from the configurable parameter numberPRB-Pairs defined in 36.331. $L'_{max}$ is 24, 16 and 8, if numberPRB-Pairs is 6, 4 and 2, respectively. $L'_{max-2}$ is the aggregation level two levels below $L'_{max}$, and $L'_{max-2}$ is 8, 4 and 2, if numberPRB-Pairs is 6, 4 and 2, respectively.
NOTE 3:
Refer to Table 6.3.4.2.3-1 with v = 1 in TS36.211.

TABLE 2

MPDCCH transmission parameters for
UE category M1 with CE mode B

| Attribute | In-sync | Out-of-sync |
|---|---|---|
| Power ratio of MPDCCH DMRS to CRS | 0 dB | 0 dB |
| Codebook index (NOTE 3) | 0 | 0 |
| Maximum MPDCCH repetition level | $R_{max}$ Note1 | $R_{max}$ Note1 |
| Aggregation level (ECCE) | $L'_{max}$ Note2 | $L'_{max}$ Note2 |
| MPDCCH Transmission type | Distributed | Distributed |

Note1
$R_{max}$ is determined by the configurable parameter mPDCCH-NumRepetition defined in 36.331 and $R_{max} > 1$.
Note2
$L'_{max}$ and $L'_{max-2}$ is derived from the configurable parameter numberPRB-Pairs defined in 36.331. $L'_{max}$ is 24, 16 and 8, if numberPRB-Pairs is 6, 4 and 2, respectively. $L'_{max-2}$ is the aggregation level two levels below $L'_{max}$, and $L'_{max-2}$ is 8, 4 and 2, if numberPRB-Pairs is 6, 4 and 2, respectively.
NOTE 3:
Refer to Table 6.3.4.2.3-1 with v = 1 in TS36.211

It will be appreciated that in Tables 1 and 2 presented above, the example values of parameters for in-sync and out-of-sync are the same. These values are provided merely for the purposes of illustration, and it is likely that an operational value of these parameters, which may by specified, will be different for in-sync and out-of-sync cases.

In some examples, if an E1 event is triggered and the UE is configured with mpdcch-crs-connected-config, the $Q_{out}$ threshold ($Q_{out\_Cat\_M1}$) may be defined as the level at which the downlink radio link cannot be reliably received and may correspond to 10% block error rate of a hypothetical MPDCCH transmission with transmission parameters specified in Table A below.

TABLE 1A

MPDCCH transmission parameters for Out-of-sync for UE category
M1 with CE mode A configured with mpdcch-crs-connected-config

| Attribute | Out-of-sync |
|---|---|
| DCI format | 6-1A |
| Starting OFDM symbols | 2; Bandwidth >= 10 MHz |
| | 3; 3 MHz <= Bandwidth < 10 MHz |
| | 4; Bandwidth = 1.4 MHz |
| Maximum MPDCCH repetition level | Rmax Note1 |
| Aggregation level (ECCE) | L'max Note2 |
| MPDCCH Transmission type | Distributed |
| Power offset between CRS and DMRS antenna ports of MPDCCH | 0 dB |

Note1
$R_{max}$ is determined by the configurable parameter mPDCCH-NumRepetition defined in 36.331 and $R_{max} > 1$ to trigger Out-of-snyc.
Note2
$L'_{max}$ is derived from the configurable parameter numberPRB-Pairs defined in 36.331. $L'_{max}$ is 24, 16 and 8, if numberPRB-Pairs is 6, 4 and 2, respectively.

In another example, if the UE is monitoring the physical layer based on a first set of transmission parameters associated with both CRS and DMRS, and triggers a second type of events associated with RLM (e.g. exceeding threshold Qin, earlyQin) then the UE adapts the RLM procedure based on that event. Adapting of RLM herein means, the UE uses a second set of transmission parameters associated with CRS based SNR measurement and uses the mapping table which only depends on DMRS or CRS reference signals to derive the hypothetical BLER of the control channel.

In another example, the UE can be configured by the network node, whether the UE upon triggering certain type of RLM related events (e.g. passing threshold early Qout), shall monitor the physical layer based on a second set of RLM transmission parameters or based on a first set of RLM transmission parameters of signals transmitted in cell1. The second set is associated with only CRS transmission in cell1, whereas the first set is associated with both CRS and DMRS transmission in cell1.

In another example of the present disclosure, a method is provided according to which a UE, after reporting a measurement event on the basis of a measurement performed on a first type of reference signal received from a base station, selects, on the basis pf the reported measurement event, whether to monitor the radio link with the base station using only the first type of reference signal or using both the first type of reference signal and the second type of reference signal. The radio link may comprise a control channel, and monitoring the radio link may comprise performing channel estimation.

Other examples of the present disclosure are related to a network node (e.g. eNodeB) serving the UE in cell1. Such examples involve the network node receiving RLM measurement reporting (e.g. event E1/E2) and using that information to adapt the control channel transmission parameters. If earlyQout event is reported, then the network node transmits the control channel following the transmission parameters in Table 2, which are associated with both CRS and DMRS transmission in cell1. If other events are reported (e.g. Qin, earlyQin), then the network node starts transmitting the control channel using transmission parameters that only depends on DMRS reference signal There are, proposed herein, various embodiments which address one or more of the issues disclosed herein.

Certain embodiments may provide one or more of the following technical advantage(s): Improved RLM performance under extended coverage, which can prevent UE from prematurely declaring radio link failure; and improved usage of network resources as the control channel decoding is improved.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
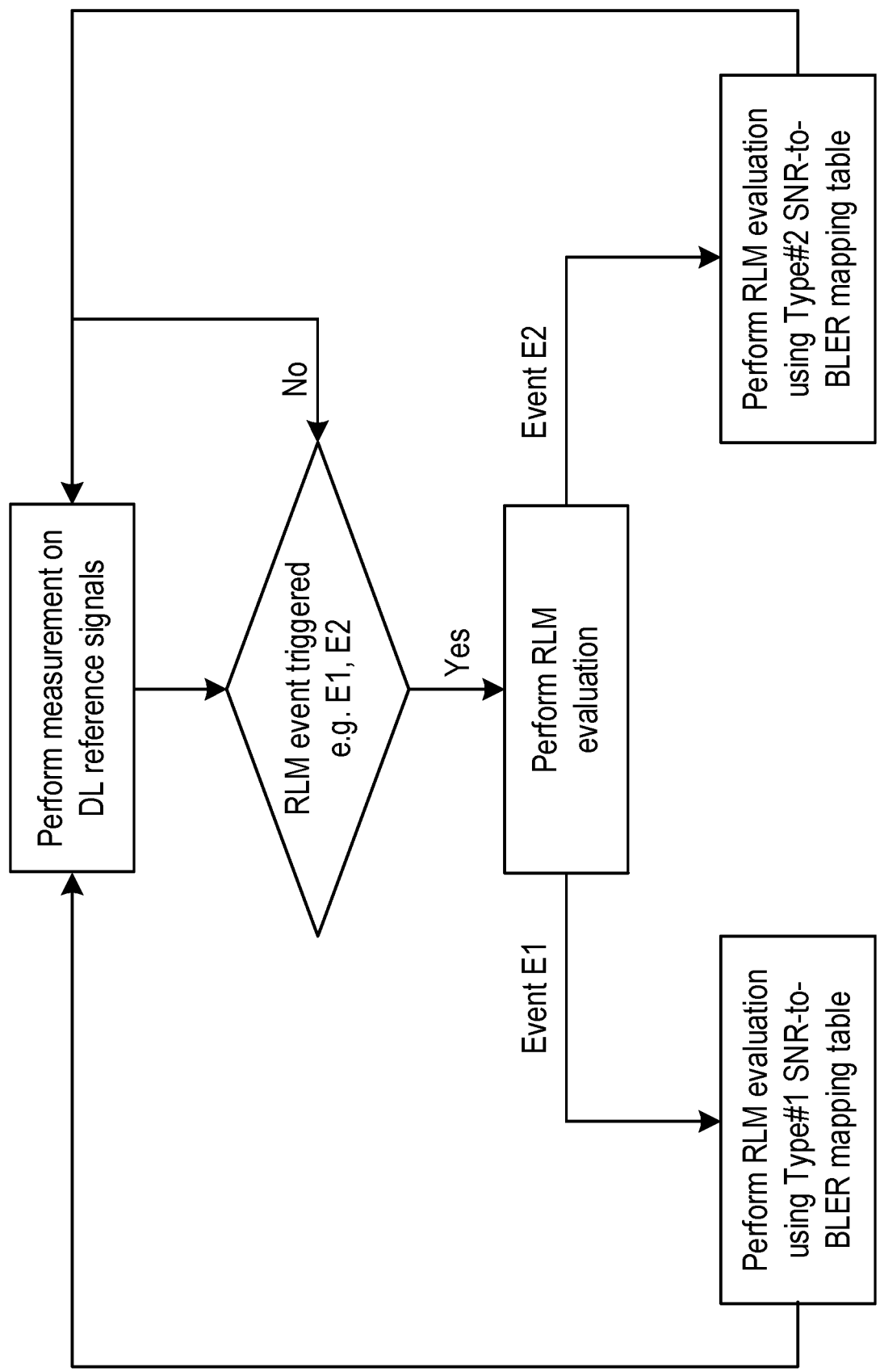
FIG. 1 is a flow chart illustrating UE steps in a method according to examples of the present disclosure

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

To provide additional context to the present disclosure, it is noted that the Rel-16 WI on "Additional MTC enhancements for LTE" [1][2] has several objectives affecting different working groups. The potential RAN4 work for these objectives is discussed below, together with a time plan.

Discussions

In this section we discuss the expected RAN4 work with regard to the different work item objectives listed in RP-182891, "Revised WID: Additional MTC enhancements for LTE".

Improved DL transmission efficiency and/or UE power consumption

Specify support for mobile-terminated (MT) early data transmission (EDT) [RAN2, RAN3]

Specify quality report in MSG3 at least for EDT [RAN1, RAN2]

Specify aperiodic quality report in connected mode using same quality definition as in Msg3 [RAN1, RAN2, RAN4]

Specify MPDCCH performance improvement by using CRS at least for connected mode [RAN1, RAN2, RAN4]

Specify support for UE-group wake-up signal (WUS) [RAN1, RAN2, RAN4]

The above objective requires following RAN4 work:

RRM requirements needed to estimate the repetition levels needed for quality report in MSG3 in RRC_CONNECTED mode.

RRM work needed for MPDCCH performance improvement using CRS. This may affect the RLM procedure and RAN4 needs to evaluate the potential RLM improvement.

RAN4 needs to study, and if needed, specify RRM requirements for release 16 group WUS based on the physical layer design.

Improved UL transmission efficiency and/or UE power consumption

Specify support for transmission in preconfigured resources in idle and/or connected mode based on SC-FDMA waveform for UEs with a valid timing advance [RAN1, RAN2, RAN4]

Both shared resources and dedicated resources can be discussed

Note: This is limited to orthogonal (multi) access schemes

The above objective requires RAN4 work which includes the following:

Transmission using preconfigured uplink resources may require corresponding RRM requirements.

Scheduling Enhancement

Specify scheduling multiple DL/UL transport blocks with or without DCI for SC-PTM and unicast [RAN1, RAN2]

Enhancement of SPS can be discussed.

The above objective requires following RAN4 work:

No RRM work expected.

Mobility Enhancement

Consider improving the DL RSRP and, if needed, RSRQ measurement accuracy, through use of RSS [RAN1, RAN4, RAN2]

Specify relaxation of RRM measurements for serving cell for UEs using WUS for at least low mobility UEs [RAN4, RAN2]

The above objective requires RAN4 work which includes the following:

RRM work is needed to study and specify RSS based RRM requirements.

RRM work is needed to specify requirements for serving cell RRM measurement relaxation.

Extreme coverage for non-BL UEs

Specify CE mode A and B improvements for non-BL UEs from among the following list [RAN1, RAN2, RAN4]

Enhancements to idle mode mobility

UE demodulation performance requirements for 2 RX antennas and full duplex FDD

Dual layer DL reception

Feedback based on CSI-RS

ETWS/CMAS in connected mode

The above objective requires RAN4 work which includes the following: RAN4 shall follow the RAN2 outcome on enhancements to IDLE mode mobility work and define RRM requirements if needed.

Stand-Alone Deployment

Enable the use of LTE control channel region for DL transmission (MPDCCH/PDSCH) to BL/CE UEs [RAN1, RAN2, RAN4]

This deployment mode should support legacy operation for legacy BL/CE UEs.

The above objective requires RAN4 work which includes the following:

RAN4 shall follow the RAN1 outcome and if needed, define corresponding requirements.

Coexistence with NR:

Study NR and LTE specifications to identify possible issues related to coexistence of LTE-MTC with NR [RAN4, RAN1, RAN2]

The above objective requires RAN4 work which includes the following:

This objective requires at least UE and BS RF work, and RRM is FFS.

Time Plan

In this section we present the WI rapporteur's view of the time plan for the WI.

February 2019

RAN4 Core Part:

Initial discussions/agreements

Discussions on transmissions using PUR based on incoming LS in April 2019 [R1-1813778, "LS on preconfigured uplink resources in NB-IoT and MTC", RAN WG1]

RSS based measurements based on incoming LS in [R1-1811934, "LS on RSRP measurements using RSS for Rel-16 LTE-MTC", RAN WG1]
Initial RRM discussions on other objectives based on progress in other working groups
Discuss simulation assumptions
May 2019
RAN4 Core Part:
Agree simulation assumptions
August 2019
RAN4 Core Part:
Align simulation results
October 2019
RAN4 Core Part:
Agree requirements
November 2019
RAN4 Core Part:
Agree final CRs
December 2020
RAN:
Approve CRs for core part The above discussion thus presents the WI rapporteur's view of the expected RAN4 work and time plan for the Rel-16 WI on "Additional MTC enhancements for LTE".

REFERENCES

RP-182891, "Revised WID: Additional MTC enhancements for LTE"
RP-182904, "TU overview after RAN #82"
R1-1813778, "LS on preconfigured uplink resources in NB-IoT and MTC", RAN WG1
R1-1811934, "LS on RSRP measurements using RSS for Rel-16 LTE-MTC", RAN WG1

Terminologies and Applicable Scenario

In some examples a more general term "network node" is used and it can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software), etc. A network node as described below may for example comprise a network node 360 as described in further detail below with reference to FIG. 3, or a network node as described with reference to any of the FIGS. 5 to 11, 14 or 15.

In some examples the non-limiting term user equipment (UE) or wireless device is used, and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc. A UE as described below may for example comprise a wireless device 310 or a UE 400 as described in further detail below with reference to FIGS. 3 and 4 or a wireless device as described with reference to any of the FIGS. 5 to 11, 12 or 13.

The examples and embodiments are described for LTE e.g. MTC and NB-IoT. However, the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000, 5G, NR, etc.

The term time resource used herein may correspond to any type of physical resource or radio resource expressed in terms of length of time. Examples of time resources are: symbol, mini-slot, time slot, subframe, radio frame, TTI, short TTI, interleaving time, etc.

As discussed in further detail below, for LTE BL/CE UEs, TS36.133 specifies two types of RLM requirements; one for legacy RLM Qin/Qout reporting requirements; another for enhanced RLM requirements.

The legacy RLM requirements are same as Rel-8 LTE RLM requirements; UEs are required to estimate the downlink radio link quality (e.g., SINR) and compare it to the thresholds Qout and Qin. If the estimated quality is worse than Qout, the UE layer 1 process sends an out-of-synch indication to the higher layer where Qout corresponds to the hypothetical MPDCCH BLER of 10%. If the estimated quality is better than Qin, the UE layer 1 process sends an in-synch indication to the higher layer where Qin corresponds to the hypothetical MPDCCH BLER of 2%. For the UE category M1, TS36.133 specifies the MPDCCH transmission parameters assumed for the evaluation of RLM out-of-synch and in-synch.

The enhanced RLM requirements were introduced in Rel-14 as an optional capability where UE is also required to estimate the downlink radio link quality, but UE layer 1 process sends an early out-of-synch indication to the higher layer if the estimated quality is worse than $Q_{E1out}$, where $Q_{E1out}$ corresponds to the hypothetical MPDCCH BLER of 10%. If the estimated quality is better than $Q_{E1in}$, UE sends an early in-synch indication to the higher layer where $Q_{E1in}$ corresponds to the hypothetical MPDCCH BLER of 2%. When UE higher layer receives the N310 consecutive early out-of-synch indications, UE starts the early out-of-synch timer (T314). If T314 is expired, then UE reports Event E1 to the network. Similarly, when UE higher layer receives N311 early in-synch indications, UE starts the early in-synch timer (T315). If T315 is expired, then UE reports Event E2 to the network. UE may also include the excess number of repetitions in the reported event report E2 using the RRC parameter excessRep-MPDCCH. TS36.133 specifies the MPDCCH transmission parameters assumed for early out-of-synch and early out-of-synch evaluation.

Since MPDCCH only uses DCI format 6-1A and 6-1B for downlink scheduling for CE Mode A and CE Mode B in CONNECTED mode, respectively, MPDCCH aggregation level and repetition level are only the parameters to differentiate RLM Qin/Qout and enhanced RLM early in-synch and early out-of-synch. As shown in the Table below, TS38.133 assumes different MPDCCH aggregation/repetition levels in order to avoid to trigger, for example, Qout and early out-of-synch at the same time.

Considering a UE that is in-synch at a time T0, if the link quality is worse than $Q_{E1out}$, the UE sends the early out-of-synch indication to the higher layer. If the link quality is worse than $Q_{out}$, the UE sends the out-of-synch indication to the higher layers. On the other hand, if the link quality recovers and the link quality is better than $Q_{in}$, the UE sends the in-synch indication to the higher layer. If the link quality improves further and is better than $Q_{E2in}$, then the UE sends the early in-synch indication to the higher layer. It is assumed that $Q_{E2in} > Q_{in} > Q_{E1out} > Q_{out}$.

MPDCCH aggregation level and repetition levels RLM and enhanced RLM.

|  | Aggregation level | Repetition level |
|---|---|---|
| RLM out-of-synch | $L_{max}$ | $R_{max}$ |
| Enhanced RLM Event E1 | $L_{max-1}$ | $R_{max}/2$ |
| RLM in-synch | $L_{max-2}$ | $R_{max}/2$ |
| Enhanced RLM Event E2 | $L_{max-2}$ | $R_{max}/8$ |

Improved MPDCCH can lower the thresholds of hypothetical MPDCCH BLER, $Q_{out}$, $Q_{in}$, $Q_{E1out}$, and $Q_{E2in}$. From the radio link monitoring performance perspective, improved MPDCCH may be beneficial especially for out-of-synch to keep a UE connected to the network. Aspects of the present disclosure therefore propose to apply the improved MPDCCH transmission parameter to $Q_{out}$ when UE reports Event E1 to the network. Parameter $Q'_{out}$ corresponds to the hypothetical MPDCCH BLER of 10% with improved MPDCCH. Thus if the network configures the enhanced RLM (r/m-ReportConfig) and improved MPDCCH (mpdcch-crs-connected-config), the UE may apply the improved MPDCCH transmission parameters for evaluating the out-of-synch when UE reports the Event E1 to the network.

An example scenario comprises a UE served by a first cell (cell1). Cell1 is managed or served or operated by a network node (NW1) e.g. a base station. The UE operates in a certain coverage enhancement (CE) level with respect to a certain cell e.g. with respect to cell1. The UE is configured to receive signals (e.g. paging, WUS, NPDCCH, NPDCCH, MPDSCH, PDSCH etc) from at least cell1. The UE may further be configured performing one or more measurement on cell1 and one or more additional cells e.g. neighbor cells.

The coverage enhancement (CE) level of the UE is also interchangeably called as coverage level of the UE. The CE level can be expressed in terms of:
  received signal quality and/or received signal strength at the UE with respect to a cell and/or
  received signal quality and/or received signal strength at a cell with respect to the UE.

The CE level of the UE be defined with respect to any cell such as serving cell, a neighbor cell, a reference cell etc. For example, it can be expressed in terms of received signal quality and/or received signal strength at the UE with respect to a target cell on which the UE performs one or more radio measurements. Examples of signal quality are SNR, SINR, CQI, NRSRQ, RSRQ, CRS Ês/Iot, SCH Ês/Iot etc. Examples of signal strength are path loss, couple loss, RSRP, NRSRP, SCH_RP etc.

The notation Ês/Iot is defined as ratio of
  Ês, which is the received energy per RE (power normalized to the subcarrier spacing) during the useful part of the symbol, i.e. excluding the cyclic prefix, at the UE antenna connector, to
  Iot which is the received power spectral density of the total noise and interference for a certain RE (power integrated over the RE and normalized to the subcarrier spacing) as measured at the UE antenna connector The CE level can be expressed in at least two different levels. Consider an example of two different CE levels defined with respect to signal quality (e.g. SNR) at the UE comprising of:

Coverage enhancement level 1 (CE1) comprising of SNR≥−6 dB at UE with respect to a cell; and
Coverage enhancement level 2 (CE2) comprising of −15 dB≤SNR<−6 dB at UE with respect to a cell.

In the above example the CE1 may also be interchangeably referred to as normal coverage level (NCL), baseline coverage level, reference coverage level, basic coverage level, legacy coverage level etc. On the other hand, CE2 may be termed as enhanced coverage level or extended coverage level (ECL).

In another example two different coverage levels (e.g. normal coverage and enhanced coverage) may be defined in terms of signal quality levels as follows:
  The requirements for normal coverage are applicable for the UE category NB1 with respect to a cell provided that radio conditions of the UE with respect to that cell are defined as follows SCH Ês/Iot≥−6 dB and CRS Ês/Iot≥−6.
  The requirements for enhanced coverage are applicable for the UE category NB1 with respect to a cell provided that radio conditions of the UE with respect to that cell are defined as follows SCH Ês/Iot≥−15 dB and CRS Ês/Iot≥−15.

In another example one or more parameters defining CE of the UE with respect to a cell (e.g. serving cell, neighbour cell etc) may also be signalled to the UE by the network node. Examples of such parameters are CE Mode A and CE Mode B signalled to UE category M1, UE category M2 etc. The UE configured with CE Mode A and CE Mode B are also said to operate in normal coverage and enhanced coverage respectively. For example:
  The requirements for CE Mode A apply provided the UE category M1 or UE category M2 is configured with CE Mode A, SCH Ês/Iot≥−6 dB and CRS Ês/Iot≥−6 dB.
  The requirements for CE Mode B shall apply provided the UE category M1 or UE category M2 is configured with CE Mode B, SCH Ês/Iot≥−15 dB and CRS Ês/Iot≥−15 dB.

In another example the UE may also determine the CE level with respect to a cell (e.g. cell1 etc) during the random access transmission procedure to that cell. For example, the UE selects the random access transmission resources (e.g. repetition level of RA channels) which are associated with different CE levels (e.g. PRACH CE level 0, CE level 1, CE level 2 etc) based on the received signal level (e.g. RSRP, NRSRP etc). The UE selects or determines the CE level (e.g. PRACH CE level) based on the signal measurement results performed by the UE (e.g. RSRP, NRSRP, path loss).

In general in larger CE level the UE is capable of operating under received signal level (e.g. RSRP, path loss, SNR, SINR, Ês/Iot, RSRQ etc) which is lower than the received signal level in smaller CE level. The embodiments are applicable for any number of CE levels of the UE with respect to a cell e.g. CE1, CE2, CE3, CE4 etc. In this example CE1 corresponds to smallest CE level while CE2 corresponds to larger CE level with respect to CE1 but smaller with respect to CE3 and CE3 corresponds to larger CE level with respect to CE2 but smaller with respect to CE4 and so on.

Method in a UE for adapting radio link monitoring procedure under extended coverage Overview of Proposed Method in the UE This example discloses a method in a UE for adapting the radio link monitoring procedure under enhanced coverage. The UE may for example comprise a wireless device 1110 or a UE 1200 as described in further detail below with reference to FIGS. 1 and 2 or a wireless device as described with reference to any of the FIGS. 5 to 11, 12 or 13. The overall method can be summarized as follows:

Performing measurement on downlink reference signals of the serving cell to estimate DL link quality Method for performing RLM based on the performed measurement on the downlink reference signals Performing Measurement on Downlink Reference Signals In this step, the wireless device (UE) is performing measurement on the downlink reference signals of the serving cell. The RLM procedure requires the UE to estimate the downlink link quality which is denoted as QL. UE can measure on downlink reference symbols like CRS which are typically always transmitted in the downlink subframes. CRS measurements are typically used to estimate the downlink channel and is also used to perform RSRP measurement. Although this step is exemplified for CRS signals, the same method also applies to other type of reference signals such like DMRS or discovery signals (e.g. PSS, SSS, CRI-RS etc). The measurement is typically a signal quality (e.g. SINR, SNR, RSRQ etc) indicating the signal to noise ratio of the serving cell radio link.

In a first example it is assumed that the UE is operating under normal coverage with narrowband RF bandwidth e.g. 200 kHz, 1.4 MHz etc. Normal coverage operation means that UE has good coverage e.g. SINR is not below −6 dB, or network does not need to enable coverage enhancement functionality. The UE could perform the measurement in this case using a legacy measurement procedure, i.e. measuring the signals over all resource elements in a subframe every 40 ms and then averaging that over a time known as measurement period.

In a second example it is assumed that the UE is operating under coverage enhancement with narrowband RF bandwidth. Coverage enhancement operation means that UE has worse link quality QL compared to normal coverage operation. As an example under the coverage enhancement operation the UE may experience R dB larger path loss from the serving cell compared to the normal coverage path loss. In another example under the coverage enhancement operation the UE may experience S dB lower received signal strength from the serving cell compared to normal coverage. In another example under the coverage enhancement operation, the UE may experience Q dB lower received signal quality from the serving cell compared to the signal quality it may experience under the normal coverage. It is assumed that the coverage is enhanced by 7 dB in this example. In some examples it may be enhanced by 15 or even 20 dB or even by larger value. A legacy measurement method may not yield good measurement accuracy since UE is under bad coverage meaning that the received energy in all resource elements may not be sufficient to mitigate the interference and noise. Therefore the UE may perform measurements over 2 or more consecutive subframes to achieve better measurement accuracy because the number of resource elements available for measurement is increased. The measured energy in REs are then coherently averaged and this may improve the total average measurement accuracy over the measurement period.

The number of subframes used for coherent averaging for downlink reference symbol measurement may depend on the signal level (e.g. SINR, SNR levels etc). At moderate coverage enhancement levels the measurement accuracy can be greatly improved if the reference symbols are coherently averaged over 2 or more subframes. However at extreme coverage enhancement levels this has a negative impact as the measured signals are dominated by the noise and UE is not able to separate the noise from the useful signals. Averaging of multiple subframes in this case may increase overall noise level of the measurement. Thus measurements may be performed over fewer number subframes at extreme coverage level.

Method for Performing RLM Based on the Performed Measurement on Downlink Reference Signals In this step, the UE applies the measurement result from the previous step in the RLM procedure. There are two target thresholds which correspond to X1% block error rate and Y1% block error rate of hypothetical DL control channel e.g. MPDCCH transmissions. The first BLER target, X1%, corresponds to out-of-sync, i.e. the BLER level at which the downlink radio link cannot be reliably received. The second target BLER, Y1%, correspond to in-sync, i.e. the BLER level at which the downlink radio link can be reliably received. An example of X1 is $Q_{E1\_out\_}$CatM1, which is defined in TS 36.133 section 7.19.2 as the level at which the downlink radio link cannot be reliably received, corresponding to [10]% block error rate of a hypothetical MPDCCH transmission with transmission parameters specified in Table 7.19.2-2 of TS 36.133. A measurement event corresponding to a reference signal measurement being below $Q_{E1\_out\_}$CatM1 would be an E1 type measurement event. An example of Y1 is $Q_{E2\_in\_Cat\ M1}$ which is defined in TS 36.133 section 7.19.2 as the level at which the downlink radio link can be significantly more reliably received than at $Q_{E1\_out\_}$CatM1, corresponding to [2]% block error rate of a hypothetical MPDCCH transmission with transmission parameters specified in Table 7.19.2-2 of TS 36.133. A measurement event corresponding to a reference signal measurement being above this threshold would be an E2 type measurement event.

The obtained signal quality measurement is compared to X1 and Y1, and based on this comparison an event is triggered in the UE and reported to the serving network node. Examples of events are the measurement result being above earlyQin, Qin, and below earlyQout. The comparison is based on a pre-defined mapping between signal quality measurement and values of parameters X1 and Y1 that correspond to control channel BLER, aka hypothetical BLER. In legacy RLM procedure, there is only type of mapping that maps the SNR measurement to a hypothetical BLER of the control channel. Examples of the present disclosure provide a plurality of mapping tables (separate and independent), and the UE selects and uses one of them for RLM evaluation based on a criterion comprising the type of event that has been triggered. The SNR to BLER mapping tables differ in terms of the reference signals used to derive the control channel BLERs, and relation between the SNR and BLER is therefore different.

If triggered event is of type E2, then wireless device monitors the lower (physical) layer for signals in cell1 based on an assumption that a second set of RLM transmission parameters (RTP2) will be used for transmission of a control channel and uses a second type (Type #2) of SNR-to-BLER mapping table to detect new RLM events. For example, RTP2 comprises the physical layer transmission parameters that are specific to a reference signal (RS1) such as information related to DCI, aggregation level (AL, number of frequency domain resource) and repetition level (RL, number of time domain resources).

Similarly, if the triggered event is of type E1, then the wireless device monitors the lower layer for signals in cell1 based on an assumption that a first set of RLM transmission parameters (RTP1) will be used for transmission of a control channel and uses a first type (Type #1) of SNR-to-BLER mapping table to detect new events. RTP1 comprises the physical layer transmission parameters that are specific to another reference signal (RS2) such as information related to DCI, aggregation level, repetition level, power radio between RS1 and RS2, and precoder information. RTP2 is associated with only a first type of reference signals (RS1) transmitted by cell1 and RTP1 is associated with at least two different types of reference signals (RS1 and RS2).

Table 3 and table 4 show the SNR-to-BLER mapping assuming only RS1 and assuming both RS1 and RS2, respectively. They show that BLER is improved when both RS1 and RS2 are used for mapping. Specific examples of RS1 and RS2 are CRS and DMRS, respectively.

TABLE 3

Type#2 SNR to MPDCCH BLER mapping under AWGN based on only RS1 (e.g. CRS)

| SNR (dB) | MPDCCH AL4, RL16 | MPDCCH AL8, RL8 | MPDCCH AL16, RL8 | MPDCCH AL24, RL2 | MPDCCH AL24, RL8 |
|---|---|---|---|---|---|
| −16 | 1.00 | 0.99 | 0.93 | 1.00 | 0.74 |
| −14 | 0.99 | 0.93 | 0.33 | 0.98 | 0.03 |
| −12 | 0.60 | 0.30 | 0.00 | 0.56 | 0.00 |
| −10 | 0.02 | 0.00 | 0.00 | 0.03 | 0.00 |

TABLE 4

Type#1 SNR to MPDCCH BLER mapping under AWGN based on both RS1 and RS2 (e.g. CRS and DMRS)

| SNR (dB) | MPDCCH AL4, RL16 | MPDCCH AL8, RL8 | MPDCCH AL16, RL8 | MPDCCH AL24, RL2 | MPDCCH AL24, RL8 |
|---|---|---|---|---|---|
| −16 | 1.00 | 0.99 | 0.75 | 0.99 | 0.39 |
| −14 | 0.87 | 0.70 | 0.11 | 0.87 | 0.00 |
| −12 | 0.21 | 0.06 | 0.00 | 0.24 | 0.00 |
| −10 | 0.00 | 0.00 | 0.00 | 0.00 | 0.00 |

In practice, event E2 is triggered when the UE is operating under good coverage towards the serving cell (e.g. higher SNR) and UE can receive the control channel with higher reliability. As an example the control channel reception with higher reliability comprises hypothetical BLER of MPDCCH falling below a certain threshold e.g. below 2%. Similarly, event E1 is triggered when the channel condition starts to become poor or with lower reliability, e.g. when the UE is moving out of the coverage of the serving cell. As an example the control channel reception with lower reliability comprises hypothetical BLER of MPDCCH becoming above or equal to certain threshold e.g. ≥10%.

In general, performing RLM based on multiple RS can increase the UE processing time, power consumptions and complexity, and should therefore be selectively applied. A main advantage of methods according to the present disclosure is that a UE starts doing RLM based on an assumption of multiple RS types being used for reception of a control channel only when the serving link quality starts to degrade, which is determined upon triggering of E1. Using multiple RS types may improve the BLER and this way the UE can prevent potential radio link failure. Thereafter, once event E2 is triggered which is an indication that the radio link of the serving cell is good, UE can fall back for doing RLM based on an assumption of only a single RS type being used for reception of the control channel, similar to a legacy procedure. It will be appreciated that in the event of the behavior of the network node transmitting the reference signals being specified in a manner corresponding to examples of the present disclosure, the above assumptions would correspond to the specified behavior, and the assumption made by the UE is thus that the network node will behave in the specified manner.

Moreover, type of RLM transmission parameters (whether it is RTP1 or RTP2) used for performing RLM will affect RLM evaluation period. RLM evaluation period is described above. For example, if RLM is performed based on RTP1 then the evaluation period can be made longer because the UE is in bad coverage and needs even longer time to reliably conduct measurement and perform evaluation compared to a normal coverage scenario. On other hand, the period may can be made shorter given that with RTP1 one has a more reliable mapping between SNR to hypothetical BLER, thus evaluation period can be reduced.

A UE configured to perform certain RLM (e.g. RLM #1 or RLM #2 in FIG. 2) may have to change the RLM mode e.g. from RLM #1 to RLM #2 or vice versa. A mode transition may occur of an event of a different type is triggered, such that the UE continues in RLM #1 mode for as long as events of type E1 are triggered, but transitions to RLM #2 mode if an event of type E2 is triggered. A mode transition may also occur for example if the UE which is configured to use only RS1 for MPDCCH reception is reconfigured to use both RS1 and RS2 or vice versa. Under transition the evaluation period needs to be specified. The evaluation period under transition may be different or same compared to that of the ongoing RLM mode before the transition occurs. According to another aspect of this example, upon transition between RLM modes, the UE is required to discard the results or samples of the previous RLM before transition and restart the new evaluation for the target RLM. In the new evaluation the UE is not required to combine samples obtained during the old RLM before the transition. The above general principles are described with few examples below:

For example the UE which is in the transition period between the two different RLM modes (RLM #1 and RLM #2 in FIG. 2) may need longer evaluation period because it may need to restart the evaluation. In one specific example, a UE moving from RLM #2 to RLM #1 is required to start doing evaluation using Type #1 mapping table which depends on both RS1 and RS2. According to another aspect of the rule the UE is required to discard or abandon an ongoing evaluation using Type #2 mapping table to Type #1 which can result in longer evaluation period. Similar behavior can be expected when the UE moves from RLM #1 to RLM #2 although actual measurement period can be shorter, but the evaluation period has to be restarted. The total evaluation period in the target RLM #2 can still be shorter than in RLM #1. In one example the UE in transition phase is allowed to use the evaluation period associated with the target RLM type. In another example the UE in transition phase is allowed to use the evaluation period associated with a particular RLM type. In yet another example the UE in transition phase is allowed to use the evaluation period based on the relation between the evaluation periods of the two types of the RLM modes. In yet another example the UE in transition phase is allowed to use the evaluation period corresponding to the RLM mode whose evaluation period is longer.

Figure 2:
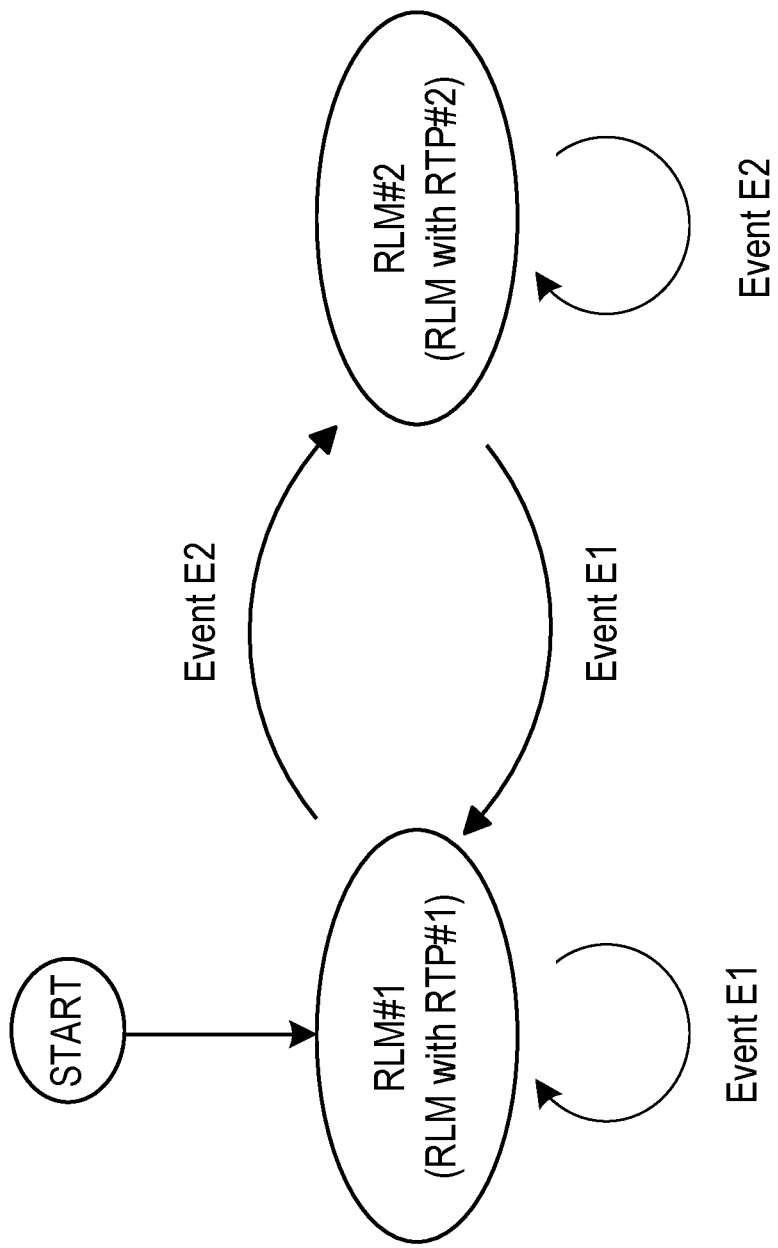
FIG. 2 illustrates state transition between different types of RLM parameters based on type of event triggering

FIG. 2 is a flow chart illustrating UE steps in a method according to examples of the present disclosure. Referring to FIG. 1, the UE performs a measurement on DL reference signals. If no RLM event is triggered (for example E1 or E2), then the UE continues to perform the measurement on DL reference signals. If an event is triggered, RLM evaluation is performed. If the triggered event is event E1, then the UE performs the RLM evaluation using a type 1 SNR-to-BLER mapping table (such as Table 4) based on both RS1 and RS2 (e.g. CRS and DMRS) and based on an assumption that a first set of RLM transmission parameters (RTP1) will be used for transmission of a control channel. As noted above, RTP1 comprises the physical layer transmission parameters that are specific to a first signal and a second reference signal (RS2) such as information related to DCI, aggregation level, repetition level, power radio between RS1 and RS2, and precoder information. If the triggered event is event E2, then the UE performs the RLM evaluation using a type 2 SNR-to-BLER mapping table (such as Table 3) based on an assumption that a second set of RLM transmission parameters (RTP2) will be used for transmission of a control channel. RTP2 comprises the physical layer transmission parameters that are specific to a first reference signal (RS1) such as information related to DCI, aggregation level (AL, number of frequency domain resource) and repetition level (RL, number of time domain resources).

FIG. 2 illustrates state transition between different types of RLM parameters based on type of event triggering. With reference to FIG. 2, a UE performing RLM with RTP1 parameters will remain in this state until an event E2 is triggered. A UE performing RLM with RTP2 parameters will remain in this state until an event E1 is triggered.

Method in a Network Node for Adapting Radio Link Monitoring Procedure Under Extended Coverage The network embodiment can be summarized as the network node receiving measurement events (e.g. RLM measurement events E1, E2) from a node (e.g. wireless node), and adapting the control channel transmission parameters based on event type. The network node may for example comprise a network node 360 as described in further detail below with reference to FIG. 3, or a network node as described with reference to any of the FIGS. 5 to 11, 14 or 15.

Receiving Measurement Events from the UE

In this step, network node receives RLM related measurement events which are reported by the wireless device. The type of events are similar to those described above with reference to methods performed by the UE embodiment.

Adapting the Control Channel Transmission According to Received Recommendation from the UE In this step the network node adapts the control channel transmission transmissions according to received indications from the UE. Adaptation depends on the received event type.

If received event is of type E2, which is an indication that the UE is operating under good coverage towards the serving cell, then the network node transmits control channel (e.g. MPDCCH, NPDCCH, PDCCH) using the transmission parameters in Table 5 and 6. Table 5 and 6 comprises the necessary transmission parameters when control channel decoding is based on one type of reference signal only in CEModeA and CEModeB respectively, e.g. RS1.

TABLE 5

MPDCCH transmission parameters for out-of-sync and in-sync for UE category M1 with CE mode A

| Attribute | Out-of-sync | In-sync |
|---|---|---|
| DCI format | 6-1A | 6-1A |
| Starting OFDM symbols | 2; Bandwidth >= 10 MHz<br>3; 3 MHz <= Bandwidth < 10 MHz<br>4; Bandwidth = 1.4 MHz | 2; Bandwidth >= 10 MHz<br>3; 3 MHz <= Bandwidth < 10 MHz<br>4; Bandwidth = 1.4 MHz |
| Maximum M-PDCCH repetition level | $R_{max}^{Note1}$ | $R_{max}/2^{\,Note1}$ |
| Aggregation level (ECCE) | $L'_{max}{}^{Note2}$ | $L'_{max-2}{}^{Note2}$ |
| M-PDCCH Transmission type | Distributed | Distributed |

Note1

$R_{max}$ is determined by the configurable parameter mPDCCH-NumRepetition defined in 36.331 and $R_{max} > 1$.

Note2

$L'_{max}$ and $L'_{max-2}$ is derived from the configurable parameter numberPRB-Pairs defined in 36.331. $L'_{max}$ is 24, 16 and 8, if numberPRB-Pairs is 6, 4 and 2, respectively. $L'_{max-2}$ is the aggregation level two levels below $L'_{max}$, and $L'_{max-2}$ is 8, 4 and 2, if numberPRB-Pairs is 6, 4 and 2, respectively.

TABLE 6

MPDCCH transmission parameters for out-of-sync and in-sync for UE category M1 with CE mode B

| Attribute | Out-of-sync | In-sync |
|---|---|---|
| DCI format | 6-1B | 6-1B |
| Starting OFDM symbols | 2; Bandwidth >= 10 MHz<br>3; 3MHz <= Bandwidth < 10 MHz<br>4; Bandwidth = 1.4 MHz | 2; Bandwidth >= 10 MHz<br>3; 3 MHz <= Bandwidth < 10 MHz<br>4; Bandwidth = 1.4 MHz |
| Maximum M-PDCCH repetition level | $R_{max}^{Note1}$ | $R_{max}/2^{\,Note1}$ |
| Aggregation level (ECCE) | $L'_{max}{}^{Note2}$ | $L'_{max-2}{}^{Note2}$ |
| M-PDCCH Transmission type | Distributed | Distributed |

Note1

$R_{max}$ is determined by the configurable parameter mPDCCH-NumRepetition defined in 36.331 and $R_{max} > 1$.

Note2

$L'_{max}$ and $L'_{max-2}$ is derived from the configurable parameter numberPRB-Pairs defined in 36.331. $L'_{max}$ is 24, 16 and 8, if numberPRB-Pairs is 6, 4 and 2, respectively. $L'_{max-2}$ is the aggregation levels two levels below $L'_{max}$, and $L'_{max-2}$ is 8, 4 and 2, if numberPRB-Pairs is 6, 4 and 2, respectively.

On the other hand, if received event is of type E1, which is an indication that the channel condition is poor, then the network node transmits control channel (e.g. MPDCCH, NPDCCH, NPDCCH) using the transmission parameters in Table 1 and/or 2. These tables comprise the necessary transmission parameters when control channel decoding is based on both RS1 and RS2 as described above.

Figure 3:
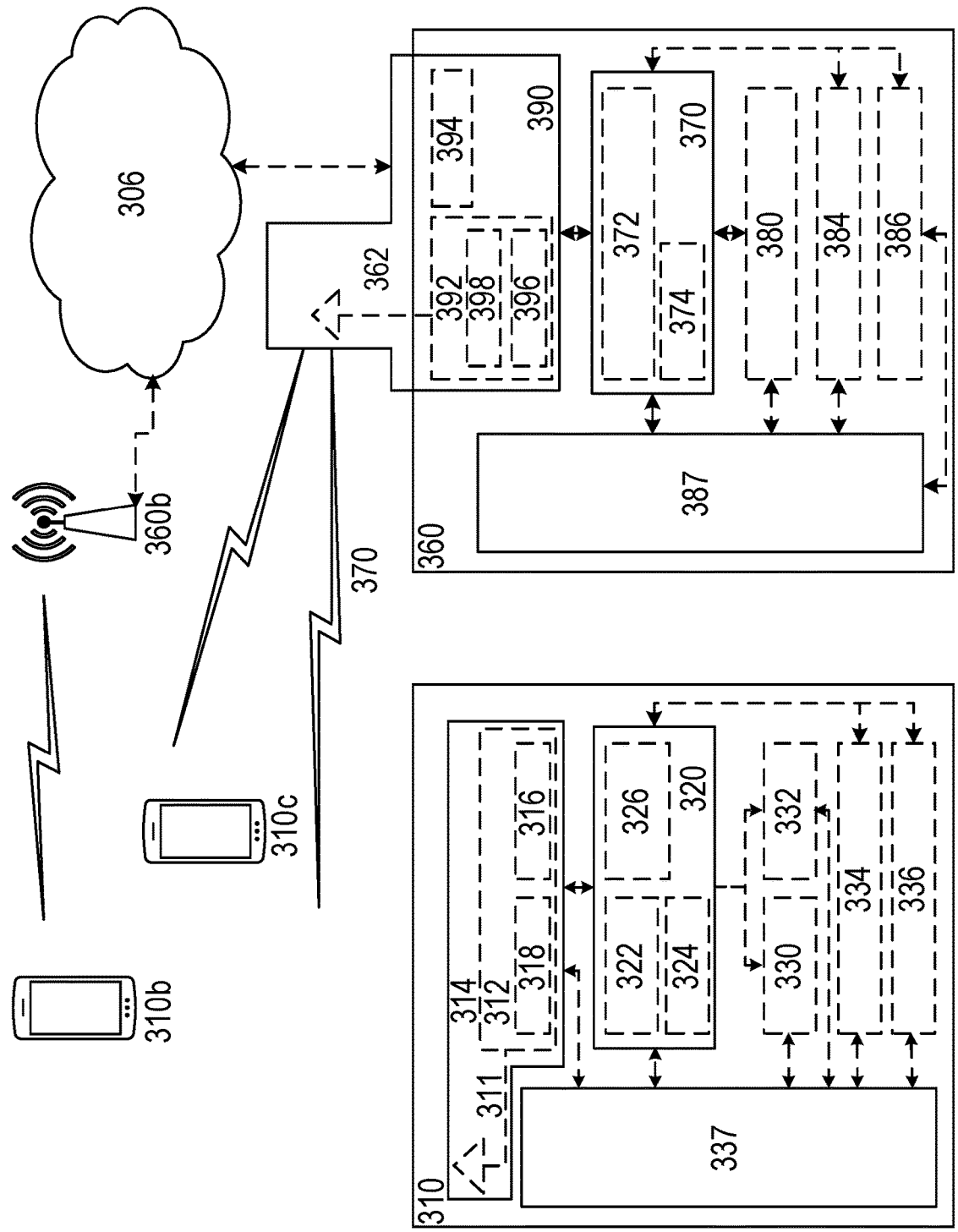
FIG. 3 illustrates a wireless network.

FIG. 3 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 306, network nodes 360 and 360b, and WDs 310, 310b, and 310c. For example, the WDs 3310, 310b, and 310c may comprise a wireless device according to any of the examples or embodiments above or below, may operate similarly to any wireless device or UE described previously and may carry out any of the methods for performance in a UE or wireless device according to the present disclosure. For example, the network nodes 360 and 360b may comprise network nodes or base stations according to any of the examples or embodiments above or below, may operate similarly to the base station or network node described previously and may carry out any of the methods for performance in a network node or base station according to the present disclosure. In practice, a wireless network may further include any additional elements suitable to support communication between wireless devices or between a wireless device and another communication device, such as a landline telephone, a service provider, or any other network node or end device. Of the illustrated components, network node 360 and wireless device (WD) 310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and WD 310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 360 includes processing circuitry 370, device readable medium 380, interface 390, auxiliary equipment 384, power source 386, power circuitry 387, and antenna 362. Although network node 360 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, WCDMA, LTE, NR, WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360, but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signalling and/or data between network node 360, network 306, and/or WDs 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or WDs via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 3394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 3 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. WD 310 may include multiple sets of one or more of the illustrated components for different wireless technologies supported by WD 310, such as, for example, GSM, WCDMA, LTE, NR, WiFi, WiMAX, or Bluetooth wireless technologies, just to mention a few. These wireless technologies may be integrated into the same or different chips or set of chips as other components within WD 310.

Antenna 311 may include one or more antennas or antenna arrays, configured to send and/or receive wireless signals, and is connected to interface 314. In certain alternative embodiments, antenna 311 may be separate from WD 310 and be connectable to WD 310 through an interface or port. Antenna 311, interface 314, and/or processing circuitry 320 may be configured to perform any receiving or transmitting operations described herein as being performed by a WD. Any information, data and/or signals may be received from a network node and/or another WD. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320, and is configured to condition signals communicated between antenna 311 and processing circuitry 320. Radio front end circuitry 312 may be coupled to or a part of antenna 311. In some embodiments, WD 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314. Radio front end circuitry 312 may receive digital data that is to be sent out to other network nodes or WDs via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 310 components, such as device readable medium 330, WD 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of WD 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a WD may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of WD 310, but are enjoyed by WD 310 as a whole, and/or by end users and the wireless network generally.

Processing circuitry 320 may be configured to perform any determining, calculating, or similar operations (e.g., certain obtaining operations) described herein as being performed by a WD. These operations, as performed by processing circuitry 320, may include processing information obtained by processing circuitry 320 by, for example, converting the obtained information into other information, comparing the obtained information or converted information to information stored by WD 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with WD 310. Such interaction may be of many forms, such as visual, audial, tactile, etc. User interface equipment 332 may be operable to produce output to the user and to allow the user to provide input to WD 310. The type of interaction may vary depending on the type of user interface equipment 332 installed in WD 310. For example, if WD 310 is a smart phone, the interaction may be via a touch screen; if WD 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into WD 310, and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from WD 310, and to allow processing circuitry 320 to output information from WD 310. User interface equipment 332 may include, for example, a speaker, a display, vibrating circuitry, a USB port, a headphone interface, or other output circuitry. Using one or more input and output interfaces, devices, and circuits, of user interface equipment 332, WD 310 may communicate with end users and/or the wireless network, and allow them to benefit from the functionality described herein.

Auxiliary equipment 334 is operable to provide more specific functionality which may not be generally performed by WDs. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. WD 310 may further comprise power circuitry 337 for delivering power from power source 336 to the various parts of WD 310 which need power from power source 336 to carry out any functionality described or indicated herein. Power circuitry 337 may in certain embodiments comprise power management circuitry. Power circuitry 337 may additionally or alternatively be operable to receive power from an external power source; in which case WD 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of WD 310 to which power is supplied.

Figure 4:
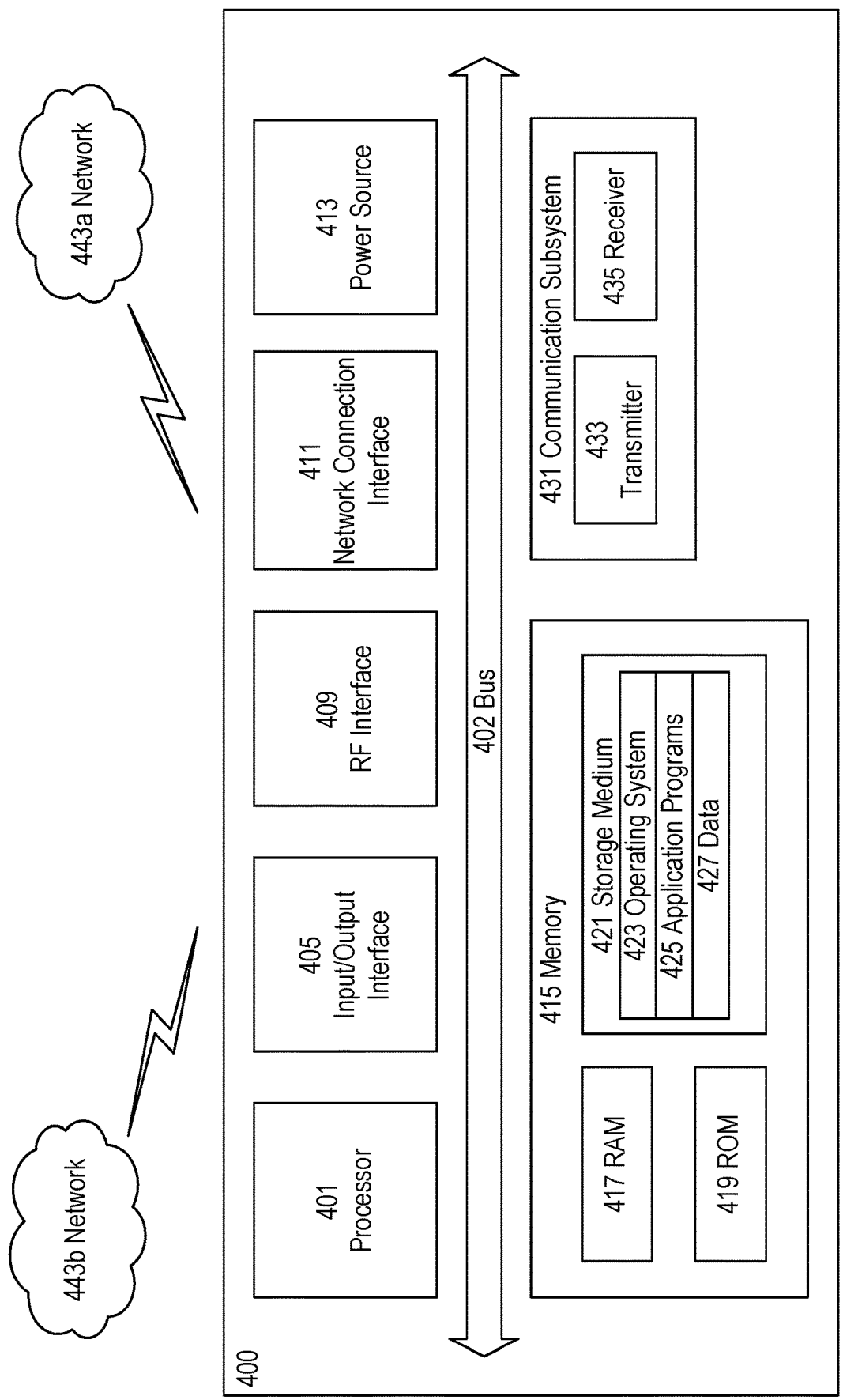
FIG. 4 illustrates a User Equipment.

FIG. 4 illustrates a User Equipment in accordance with some embodiments

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 4200 may be any UE identified by the 3$^{rd}$ Generation Partnership Project (3GPP), including a NB-IoT UE, a machine type communication (MTC) UE, and/or an enhanced MTC (eMTC) UE. UE 400, as illustrated in FIG. 4, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa. The UE 400 may comprise a wireless device or UE as described with respect to any of the examples and embodiments above or below, and may operate similarly to the wireless device or UE described previously and may carry out any of the methods for performance in a UE or wireless device according to the present disclosure.

In FIG. 4, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 409 may be configured to provide a communication interface to RF components such as a transmitter, a receiver, and an antenna. Network connection interface 411 may be configured to provide a communication interface to network 443*a*. Network 443*a* may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 4, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443b may encompass wired and/or wireless networks such as a local-area network (LAN), a wide-area network (WAN), a computer network, a wireless network, a telecommunications network, another like network or any combination thereof. For example, network 443b may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 5:
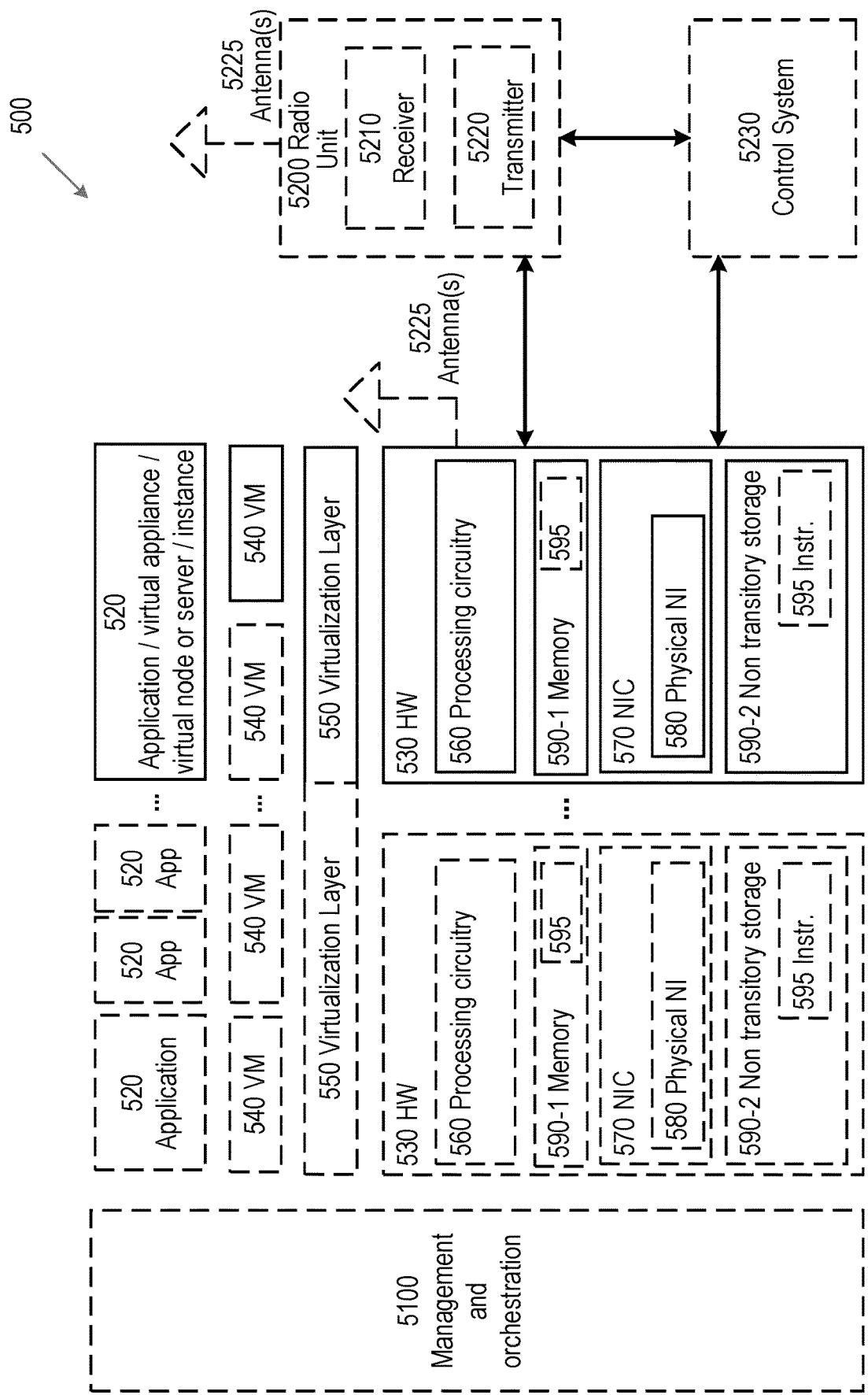
FIG. 5 illustrates a Virtualization environment.

FIG. 5 illustrates a virtualization environment in accordance with some embodiments FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 5, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 5.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signalling can be effected with the use of control system 5230 which may alternatively be used for communication between the hardware nodes 530 and radio units 5200.

Figure 6:
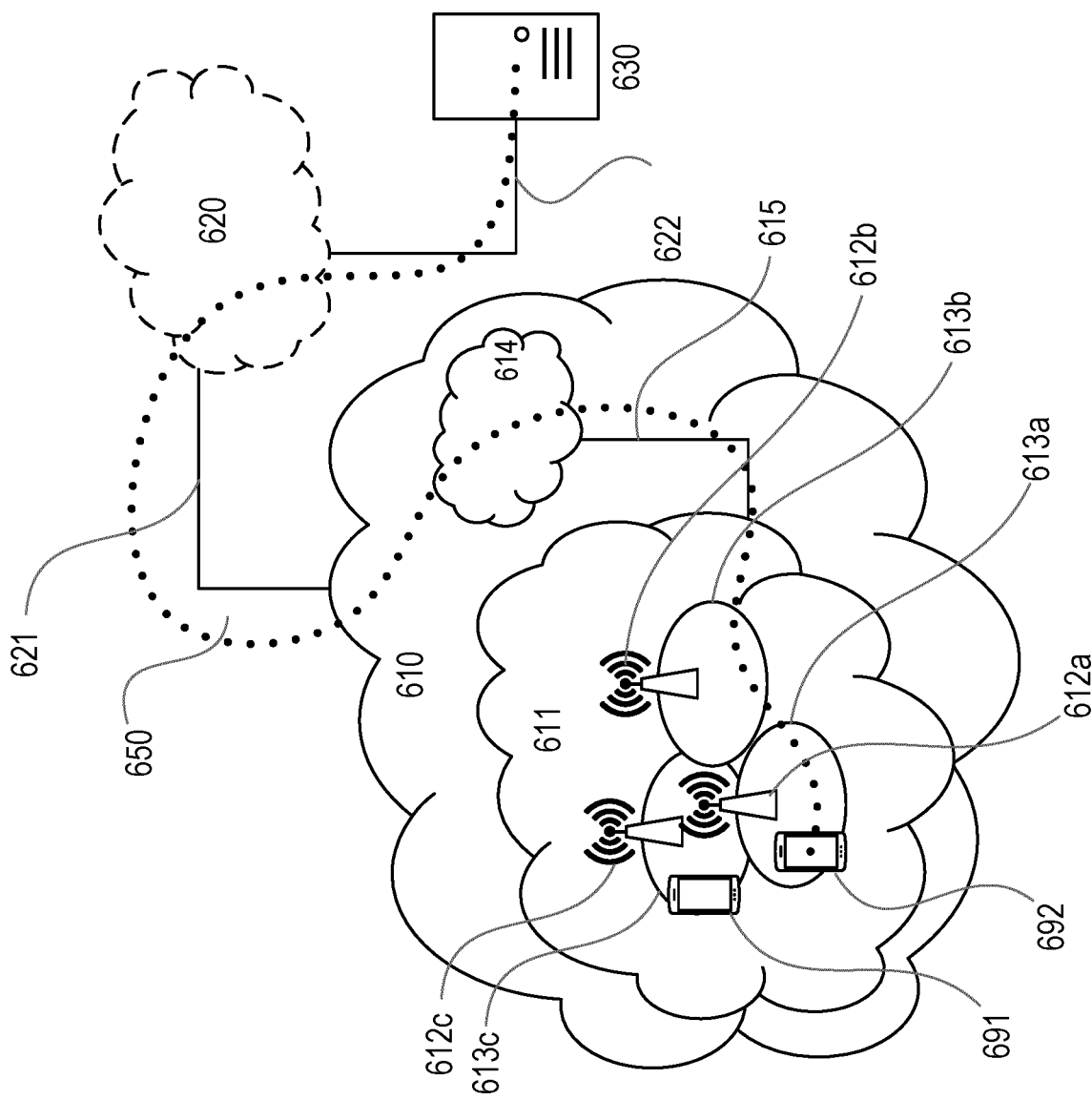
FIG. 6 illustrates a Telecommunication network connected via an intermediate network to a host computer.

FIG. 6 illustrates a telecommunication network connected via an intermediate network to a host computer in accordance with some embodiments With reference to FIG. 6, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. Each base station 612a, 612b, 612c may comprise a network node or base station according to any of the examples or embodiments above or below, may operate similarly to the base station or network node described previously and may carry out any of the methods for performance in a network node or base station according to the present disclosure. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612. Each UE 691, 692 may comprise a wireless device according to any of the examples or embodiments above or below, may operate similarly to any wireless device or UE described previously and may carry out any of the methods for performance in a UE or wireless device according to the present disclosure.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more sub-networks (not shown).

The communication system of FIG. 6 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691.

Similarly, base station 612 need not be aware of the future routing of an outgoing uplink communication originating from the UE 691 towards the host computer 630.

Figure 7:
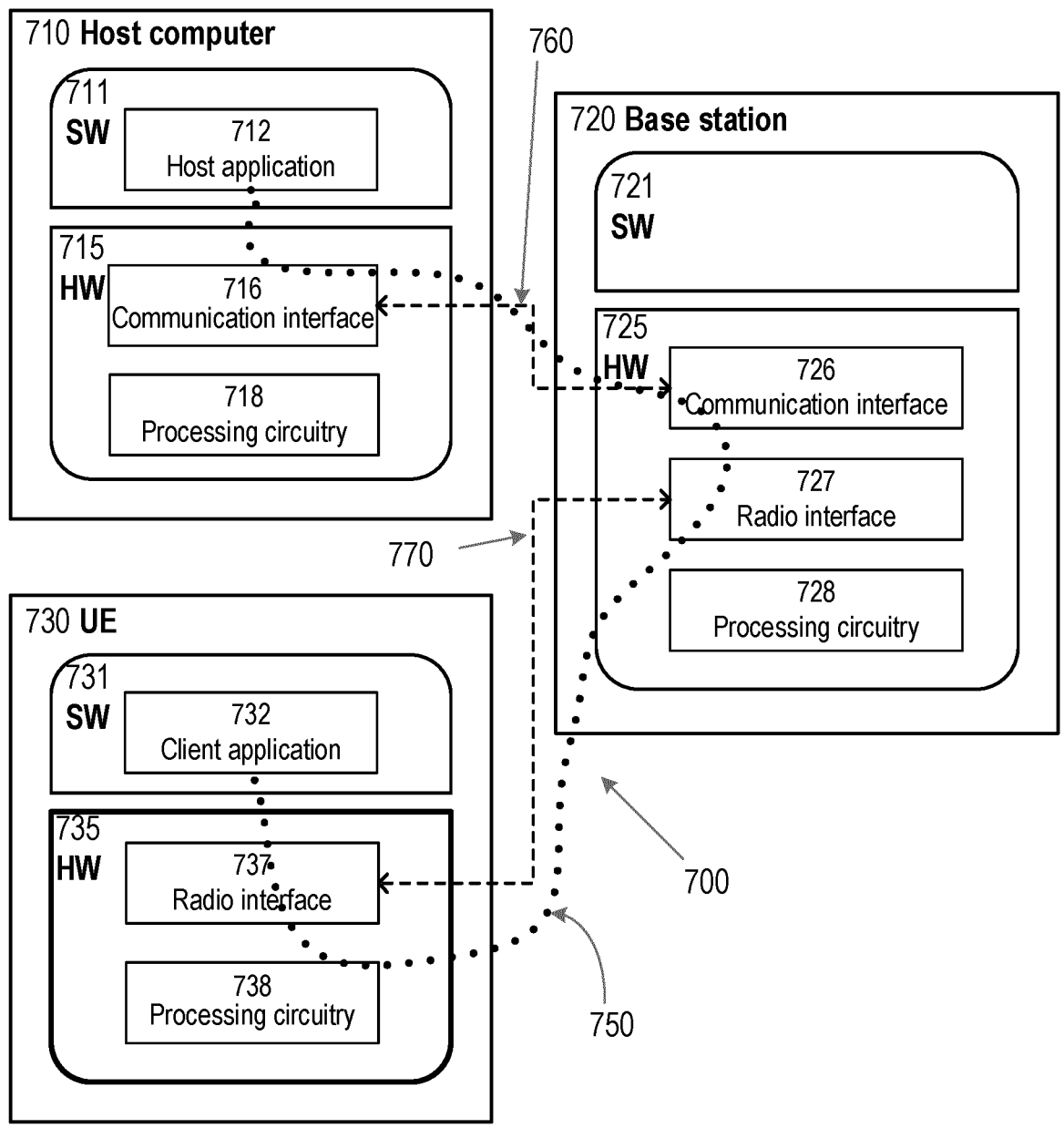
FIG. 7 illustrates a Host computer communicating via a base station with a user equipment over a partially wireless connection.

FIG. 7 illustrates a Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 7. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 7) served by base station 720. Communication interface 726 may be configured to facilitate connection 760 to host computer 710. Connection 760 may be direct or it may pass through a core network (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

It is noted that host computer 710, base station 720 and UE 730 illustrated in FIG. 7 may be similar or identical to host computer 630, one of base stations 612a, 612b, 612c and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the Radio Link Monitoring performed by the UE 730, particularly when under extended coverage, so preventing UE 730 from prematurely declaring radio link failure and thus more efficiently using network resources. The teachings of these embodiments may thereby provide benefits such as more reliable service, reduced user waiting time and better responsiveness.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figure 8:
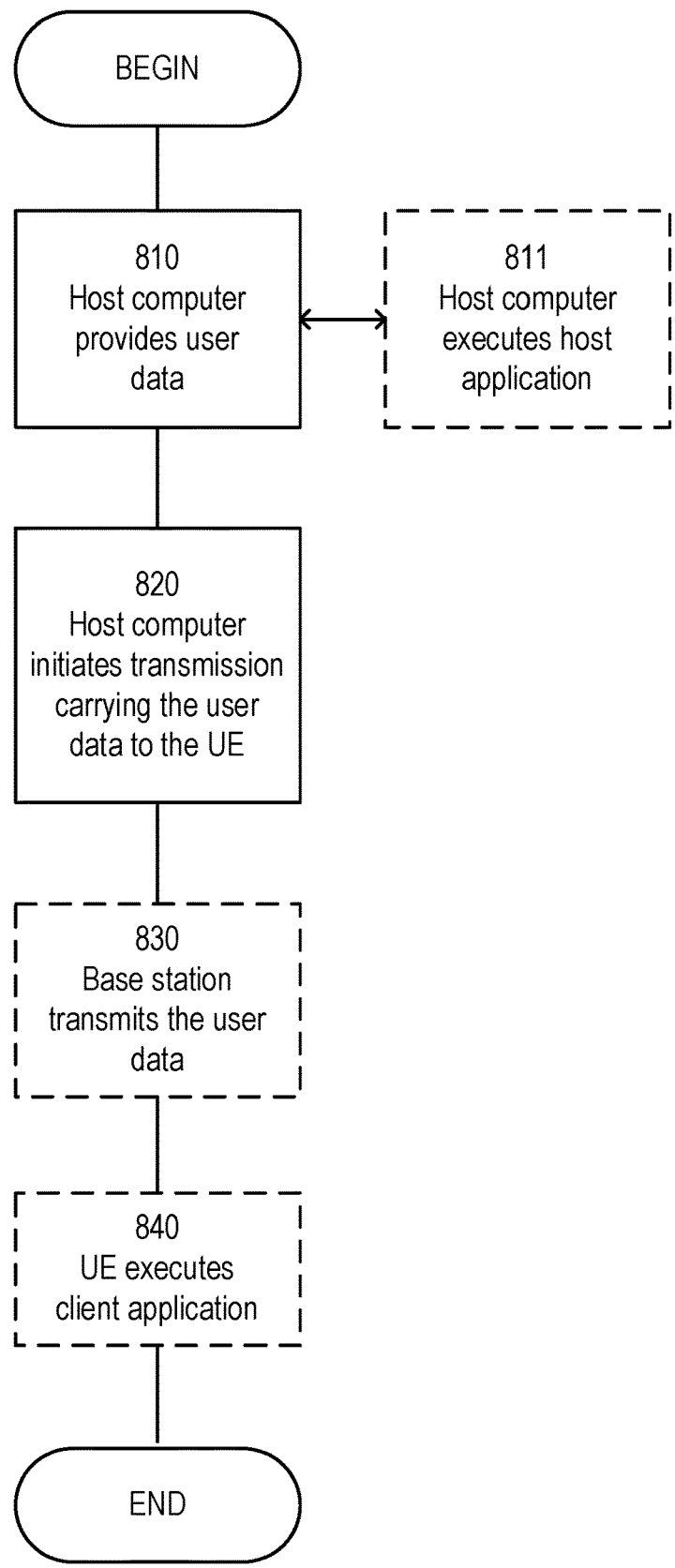
FIGS. 8 to 11 illustrate methods implemented in a communication system.

FIG. 8 illustrates methods implemented in a communication system including a host computer, a base station and a user equipment in accordance with some embodiments FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

Figure 9:
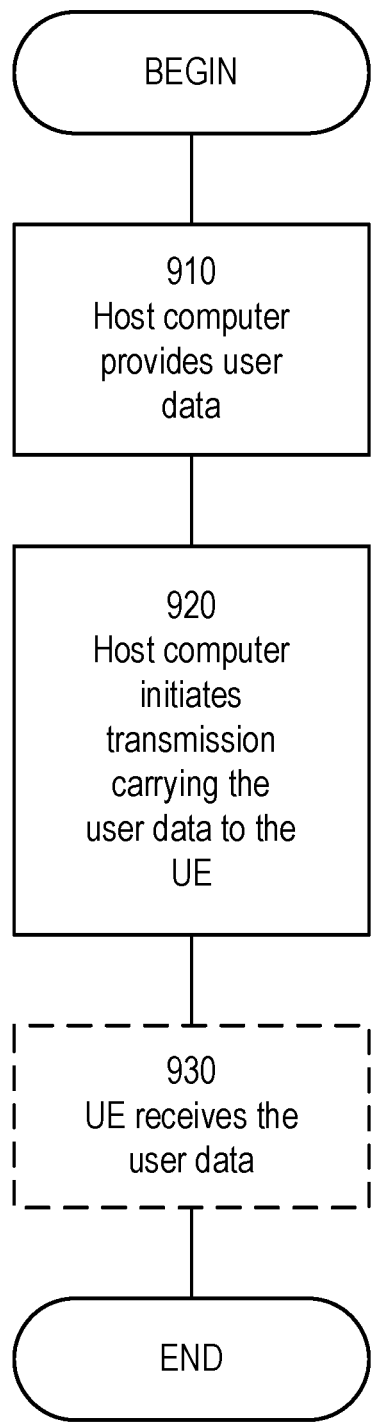

FIG. 9 illustrates methods implemented in a communication system including a host computer, a base station and a user equipment in accordance with some embodiments FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figure 10:
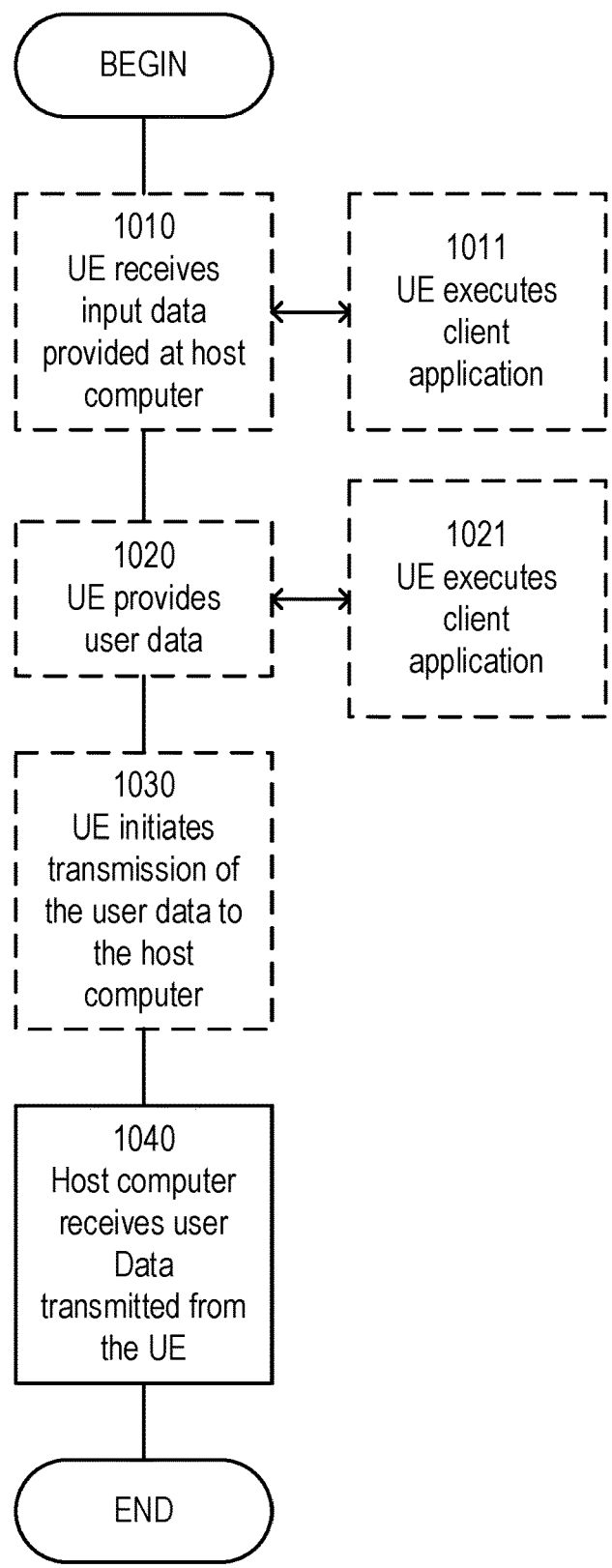

FIG. 10 illustrates methods implemented in a communication system including a host computer, a base station and a user equipment in accordance with some embodiments FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

Figure 11:
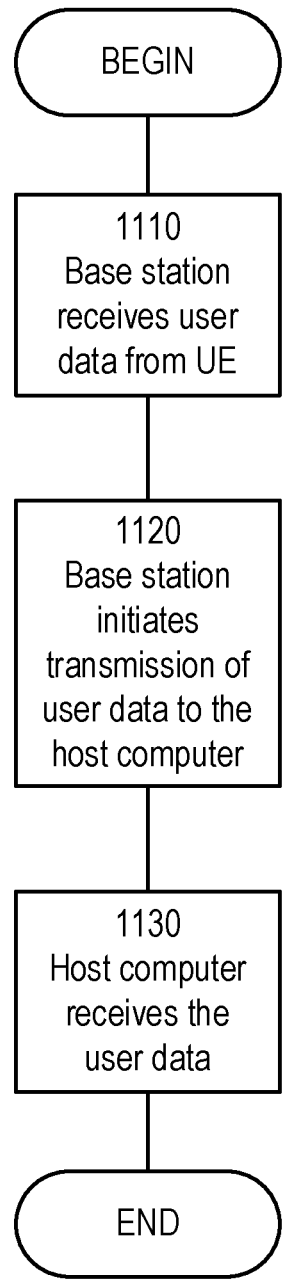

FIG. 11 illustrates methods implemented in a communication system including a host computer, a base station and a user equipment in accordance with some embodiments FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 12:
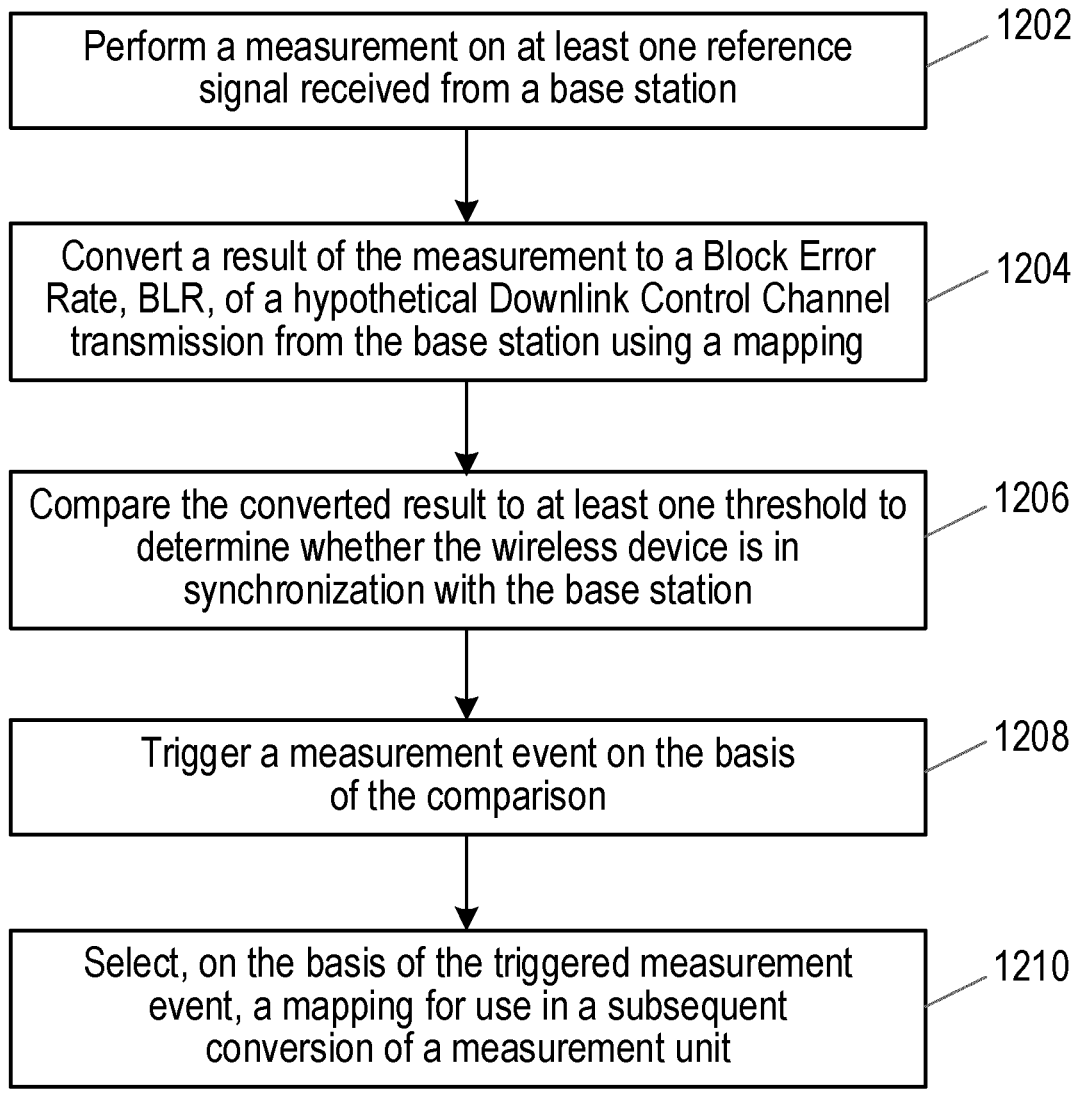
FIG. 12 illustrates a method in accordance with some embodiments of the present disclosure.

FIG. 12 illustrates a method in accordance with some embodiments

FIG. 12 depicts a method in accordance with particular embodiments, the method begins at step 1202 with performing a measurement on at least one reference signal received from a base station. In step 1204, the method comprises converting a result of the measurement to a Block Error Rate, BLER, of a hypothetical Downlink Control Channel transmission from the base station using a mapping. In step 1206, the method comprises comparing the converted result to at least one threshold to determine whether the wireless device is in synchronization with the base station. In step 1208, the method comprises triggering a measurement event on the basis of the comparison and, in step 1210, the method comprises selecting, on the basis of the triggered measurement event, a mapping for use in a subsequent conversion of a measurement result.

According to examples of the present disclosure, the method may further comprise selecting, on the basis of the triggered measurement event, Radio Link Monitoring Transmission Parameters, RTPs, corresponding to a mapping of a measurement to BLER of a hypothetical Downlink Control Channel.

According to examples of the present disclosure, the selected RTPs may be associated with a control channel configuration to be used by the base station for transmission of a control channel.

According to examples of the present disclosure, the method may further comprise selecting, on the basis of the triggered measurement event, a time period for performing a subsequent measurement.

According to examples of the present disclosure, performing a measurement of at least one reference signal received from a base station may comprise performing a measurement of a signal quality of the signal.

According to examples of the present disclosure, the measurement may comprise a measurement of at least one of: SINR, SNR, RSRQ.

According to examples of the present disclosure, the at least one reference signal received from a base station may comprise at least one of a Cell Specific Reference Signal, CRS, a Demodulation Reference Signal, DMRS, or a discovery signal.

According to examples of the present disclosure, the at least one reference signal received from the base station may be used for reception of a physical control channel.

According to examples of the present disclosure, the at least one signal received from a base station may comprise both a CRS and a DMRS.

According to examples of the present disclosure, triggering a measurement event on the basis of the comparison may comprise triggering a first type of measurement event if the comparison indicates that the wireless device is not in synchronization with the base station, and triggering a second type of measurement event if the comparison indicates that the wireless device is in synchronization with the base station.

According to examples of the present disclosure, selecting, on the basis of the triggered measurement event, a mapping for use in a subsequent conversion of a measurement result may comprise, if the triggered measurement event is first type of measurement event, selecting a mapping converting a measurement result to a BLER which mapping assumes use of RTPs associated with a control channel configuration based on at least two reference signals, and, if the triggered measurement event is a second type of measurement event, selecting a mapping converting a measurement result to a BLER which mapping assumes use of RTPs associated with a control channel configuration based on a single reference signal.

According to examples of the present disclosure, selecting RTPs on the basis of the triggered measurement event may comprise, if the triggered measurement event is a first type of measurement event, selecting RTPs associated with a control channel configuration based on at least two reference signals received from the base station; and, if the triggered measurement event is a second type of measurement event, selecting RTPs associated with a control channel configuration based on a single reference signal received from the base station.

According to examples of the present disclosure, the RTPs associated with a control channel configuration based on at least two reference signals received from the base station may comprise a power ratio of the two reference signals.

According to examples of the present disclosure, the single reference signal received from a base station may comprise one of Cell Specific Reference Signals, CRS, or Demodulation Reference Signals, DMRS, and wherein the at least two reference signals received from the base station comprise CRS and DMRS.

According to examples of the present disclosure, the method may further comprise receiving a message configuring the wireless device to change at least one of: the at least one signal received from a base station on which a measurement is performed, or the mapping used for converting a result of the measurement to a BLER.

According to examples of the present disclosure, the method may further comprise changing the at least one of the at least one signal received from a base station on which a measurement is performed; or the mapping used for converting a result of the measurement to a BLERin accordance with the received message configuration According to examples of the present disclosure, the method may further comprise adjusting a time period for performing a current measurement in accordance with the received message configuration.

According to examples of the present disclosure, the method may further comprise restarting a current measurement procedure in accordance with the received message configuration.

According to examples of the present disclosure, the method may further comprise receiving a message configuring how the wireless device is to select a mapping for use in a subsequent conversion of a measurement result on the basis of a triggered measurement event; and selecting a mapping for use in a subsequent conversion of a measurement result on the basis of a triggered measurement event in accordance with the configuration.

According to examples of the present disclosure, performing a measurement on at least one reference signal received from the base station and converting a result of the measurement using a mapping that assumes use of RTPs associated with a control channel configuration based on at least two reference signals may comprise performing Radio Link Monitoring in a first Radio Link Monitoring mode; and performing a measurement on at least one reference signal received from the base station and converting a result of the measurement using a mapping that assumes use of RTPs associated with a control channel configuration based on a single reference signal may comprise performing Radio Link Monitoring in a second Radio Link Monitoring mode.

According to examples of the present disclosure, performing a measurement on the at least one signal received from a base station may comprise performing a measurement according to a measurement procedure that corresponds to a Coverage Enhancement level in which the wireless device is operating with respect to the base station.

According to examples of the present disclosure, the method may further comprise determining a Coverage Enhancement level in which the wireless device is operating with respect to the base station.

According to examples of the present disclosure, the method may further comprise providing user data; and forwarding the user data to a host computer via a transmission to the base station.

According to another aspect of the present disclosure, there is provided a method performed by a wireless device for monitoring a radio link with a base station, the method comprising performing a measurement on a first type of reference signal received from a base station, reporting a measurement event on the basis of the measurement, and selecting, on the basis of the reported measurement event, whether to monitor the radio link with the base station using only the first type of reference signal, or both the first type of reference signal and a second type of reference signal.

According to examples of the present disclosure, the radio link may comprise a control channel.

According to examples of the present disclosure, monitoring the radio link may comprise performing a channel estimation.

According to examples of the present disclosure, selecting, on the basis of the reported measurement event, whether to monitor the radio link with the base station using only the first type of reference signal, or both the first type of reference signal and a second type of reference signal may comprises selecting a mapping table for use in converting a measurement result to a hypothetical BLER of a downlink Control Channel.

According to examples of the present disclosure, selecting a mapping table for use in converting a measurement result to a hypothetical BLER of a downlink Control Channel may comprise selecting at least one of: a mapping table converting results of a measurement performed on the first type of reference signals to a BLER of a hypothetical downlink Control Channel, which channel is decoded based on only the first type of reference signals; or a mapping table converting results of a measurement performed on the first type of reference signals to a BLER of a hypothetical downlink Control Channel, which channel is decoded based on the first type of reference signals and the second type of reference signals.

Figure 13:
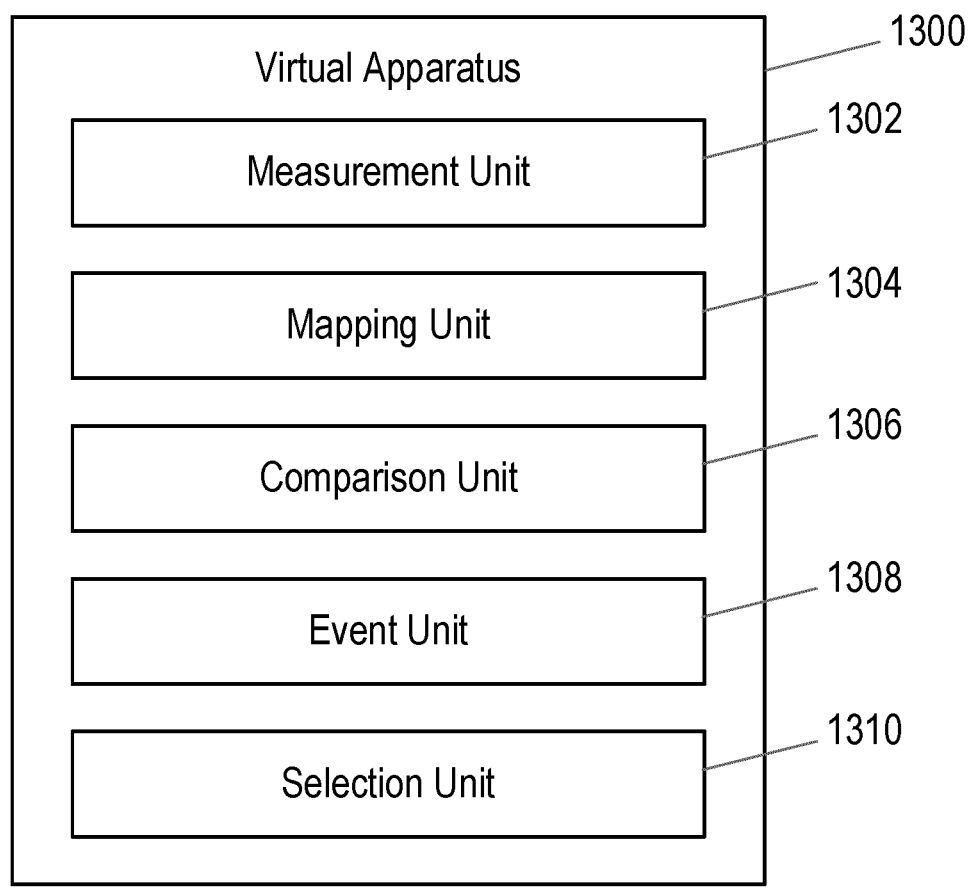
FIG. 13 illustrates a Virtualization apparatus in accordance with some embodiments of the present disclosure.

FIG. 13 illustrates a Virtualization apparatus in accordance with some embodiments.

FIG. 13 illustrates a schematic block diagram of an apparatus 1300 in a wireless network (for example, the wireless network shown in FIG. 3). The apparatus may be implemented in a wireless device or network node (e.g., wireless device 310 or network node 360 shown in FIG. 3). Apparatus 1300 is operable to carry out the example method described with reference to FIG. 12 and possibly any other processes or methods disclosed herein. It is also to be understood that the method of FIG. 12 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Measurement Unit 1302, Mapping Unit 1304, Comparison Unit 1306, Event Unit 1308 and Selection Unit 1310, and any other suitable units of apparatus 1300, to perform corresponding functions according one or more embodiments of the present disclosure.

As illustrated in FIG. 13, apparatus 1300 includes Measurement Unit 1302, Mapping Unit 1304, Comparison Unit 1306, Event Unit 1308 and Selection Unit 1310. Measurement Unit 1302 is configured to perform a measurement on at least one reference signal received form a base station. Mapping Unit 1304 is configured to covert a result of the measurement to a Block Error Rate, BLER, of a hypothetical Downlink Control Channel transmission from the base station using a mapping. Comparison Unit 1306 is configured to compare the converted result to at least one threshold to determine whether the wireless device is in synchronization with the base station. Event Unit 1308 is configured to trigger a measurement event on the basis of the comparison. Selection Unit 1310 is configured to select, on the basis of the triggered measurement event, a mapping for use in a subsequent conversion of a measurement result.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 14:
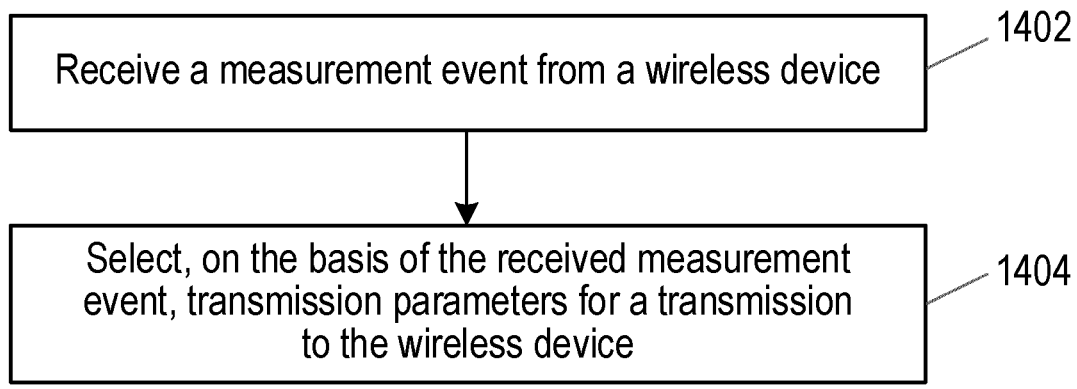
FIG. 14 illustrates a method in accordance with some embodiments of the present disclosure.

FIG. 14 illustrates a method in accordance with some embodiments.

FIG. 14 depicts a method in accordance with particular embodiments, the method begins at step 1402 with receiving a measurement event from a wireless device. In step 1404, the method comprises selecting, on the basis of the received measurement event, transmission parameters for a transmission to the wireless device.

According to examples of the present disclosure, the transmission may comprise a control channel transmission.

According to examples of the present disclosure, selecting, on the basis of the received measurement event, transmission parameters for a transmission to the wireless device may comprise selecting a first set of transmission parameters if the received measurement event indicates that the wireless device is not in synchronization with the base station; and selecting a second set of transmission parameters if the received measurement event indicates that the wireless device is in synchronization with the base station.

According to examples of the present disclosure, the first set of transmission parameters may be associated with a control channel configuration based on at least two reference signals transmitted by the base station; and the second set of transmission parameters may be associated with a control channel configuration based on a single reference signal transmitted by the base station.

According to examples of the present disclosure, the first set of transmission parameters may comprise a power ratio of the at least two reference signals.

According to examples of the present disclosure, the single reference signal transmitted by the base station may comprise one of CRS or DMRS, and the at least two reference signals transmitted by the base station may comprise CRS and DMRS.

According to examples of the present disclosure, the method may further comprise transmitting a message configuring the wireless device to change at least one of a signal transmitted by the base station on which the wireless device performs a measurement; or a mapping used by the wireless device for converting a result of the measurement.

According to examples of the present disclosure, the method may further comprise transmitting a message configuring how the wireless device is to select a mapping for use in conversion of a measurement result on the basis of a triggered measurement event.

According to examples of the present disclosure, the method may further comprise transmitting a message instructing the wireless device to change a Radio Link Monitoring mode in which the device performs Radio Link Monitoring.

According to examples of the present disclosure, the method may further comprise obtaining user data; and forwarding the user data to a host computer or a wireless device.

Figure 15:
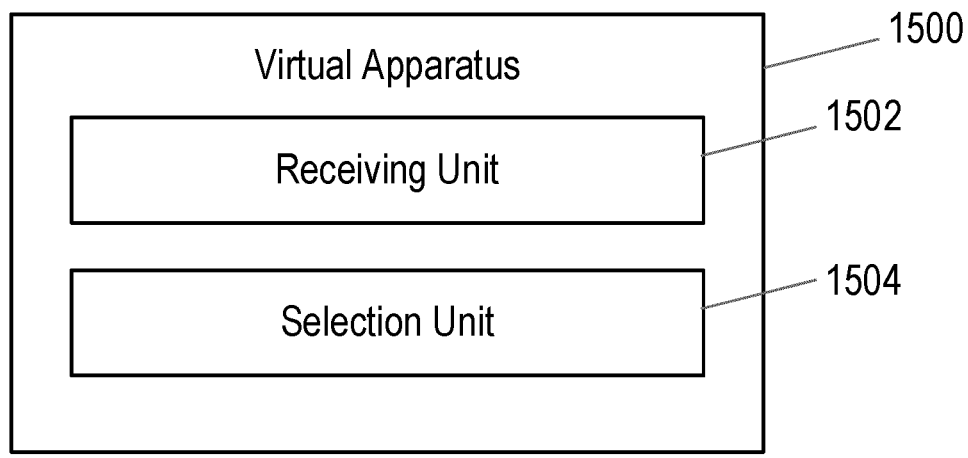
FIG. 15 illustrates a Virtualization apparatus in accordance with some embodiments of the present disclosure.

FIG. 15 illustrates a Virtualization apparatus in accordance with some embodiments.

FIG. 15 illustrates a schematic block diagram of an apparatus 1500 in a wireless network (for example, the wireless network shown in FIG. 3). The apparatus may be implemented in a wireless device or network node (e.g., wireless device 310 or network node 360 shown in FIG. 3). Apparatus 1500 is operable to carry out the example method described with reference to FIG. 14 and possibly any other processes or methods disclosed herein. It is also to be understood that the method of FIG. 14 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Receiving Unit 1502 and Selection Unit 1504, and any other suitable units of apparatus 1500, to perform corresponding functions according one or more embodiments of the present disclosure.

As illustrated in FIG. 15, apparatus 1500 includes Receiving Unit 1502 and Selection Unit 1504. Receiving Unit 1502 is configured to receive a measurement event from a wireless device. Selection Unit 1504 is configured to select, on the basis of the received measurement result, transmission parameters for a transmission to the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a wireless device for monitoring a radio link with a base station, the method comprising:
performing a measurement on at least one reference signal received from the base station;
converting a result of the measurement to a Block Error Rate (BLER) of a hypothetical Downlink Control Channel transmission from the base station using a mapping;
comparing the converted result to at least one threshold to determine whether the wireless device is in synchronization with the base station;
triggering a measurement event based on the comparison; and
selecting, based on the triggered measurement event, a mapping for use in a subsequent conversion of a measurement result, wherein triggering a measurement event based on the comparison comprises:
triggering a first type of measurement event if the comparison indicates that the wireless device is not in synchronization with the base station, and
triggering a second type of measurement event if the comparison indicates that the wireless device is in synchronization with the base station, and
wherein selecting, based on the triggered measurement event, a mapping for use in a subsequent conversion of a measurement result comprises:
if the triggered measurement event is first type of measurement event, selecting a mapping converting a measurement result to a BLER which mapping assumes use of Radio Link Monitoring Transmission Parameters (RTPs) associated with a control channel configuration based on at least two reference signals, and
if the triggered measurement event is a second type of measurement event, selecting a mapping converting a measurement result to a BLER which mapping assumes use of RTPs associated with the control channel configuration based on the at least one reference signal.

2. The method of claim 1, further comprising:
selecting, based on the triggered measurement event, RTPs corresponding to a mapping of the measurement to BLER of the hypothetical Downlink Control Channel.

3. The method of claim 2, wherein the selected RTPs are associated with the control channel configuration to be used by the base station for transmission of a control channel.

4. The method of claim 1, further comprising:
selecting, based on the triggered measurement event, a time period for performing a subsequent measurement.

5. The method of claim 1, wherein performing a measurement on the at least one reference signal received from the base station comprises performing a measurement of a signal quality of the signal.

6. The method of claim 1, wherein the at least one reference signal received from the base station comprises at least one of a Cell Specific Reference Signal (CRS) a Demodulation Reference Signal (DMRS) or a discovery signal.

7. The method of claim 1, wherein the at least one reference signal received from the base station is used for reception of a physical control channel.

8. The method of claim 1, wherein the at least one reference signal received from the base station comprises a Cell Specific Reference Signal (CRS) and a Demodulation Reference Signal (DMRS).

9. The method of claim 1, wherein the RTPs associated with the control channel configuration based on the at least two reference signals received from the base station comprise a power ratio of the at least two reference signals.

10. The method of claim 1, wherein the at least one reference signal received from the base station comprises one of Cell Specific Reference Signals (CRS) or Demodulation Reference Signals (DMRS), and wherein the at least two reference signals received from the base station comprise CRS and DMRS.

11. The method of claim 1, further comprising:
receiving a message configuring the wireless device to change at least one of:
the at least one reference signal received from the base station on which a measurement is performed; or
the mapping used for converting the result of the measurement to the BLER; and
changing the at least one of:
the at least one reference signal received from the base station on which a measurement is performed; or
the mapping used for converting the result of the measurement to the BLER in accordance with the received message configuration.

12. The method of claim 11, further comprising:
adjusting a time period for performing a current measurement in accordance with the received message configuration.

13. The method of claim 11, further comprising:
restarting a current measurement procedure in accordance with the received message configuration.

14. The method of claim 1, further comprising:
receiving a message configuring how the wireless device is to select a mapping for use in a subsequent conversion of a measurement result based on a triggered measurement event; and
selecting a mapping for use in the subsequent conversion of the measurement result based on the triggered measurement event in accordance with the configuration.

15. The method of claim 1, wherein:
performing a measurement on the at least one reference signal received from the base station and converting the result of the measurement using a mapping that assumes use of RTPs associated with the control channel configuration based on the at least two reference signals comprises performing Radio Link Monitoring in a first Radio Link Monitoring mode; and
performing the measurement on the at least one reference signal received from the base station and converting the result of the measurement using a mapping that assumes use of RTPs associated with the control channel configuration based on the at least one a single reference signal comprises performing Radio Link Monitoring in a second Radio Link Monitoring mode.

16. The method of claim 1, wherein performing the measurement on the at least one reference signal received from the base station comprises performing a measurement according to a measurement procedure that corresponds to a Coverage Enhancement level in which the wireless device is operating with respect to the base station.

17. A wireless device for monitoring a radio link with a base station, the wireless device comprising:
processing circuitry; and
power supply circuitry configured to supply power to the wireless device, wherein the processing circuitry is configured to:
perform a measurement on at least one reference signal received from the base station;
convert a result of the measurement to a Block Error Rata (BLER) of a hypothetical Downlink Control Channel transmission from the base station using a mapping;
compare the converted result to at least one threshold to determine whether the wireless device is in synchronization with the base station;
trigger a measurement event on the basis of the comparison; and
select, on the basis of the triggered measurement event, a mapping for use in a subsequent conversion of a measurement result, wherein triggering a measurement event based on the comparison comprises:
trigger a first type of measurement event if the comparison indicates that the wireless device is not in synchronization with the base station, and
trigger a second type of measurement event if the comparison indicates that the wireless device is in synchronization with the base station, and
wherein selecting, based on the triggered measurement event, a mapping for use in a subsequent conversion of a measurement result comprises:
if the triggered measurement event is first type of measurement event, select a mapping converting a measurement result to a BLER which mapping assumes use of Radio Link Monitoring Transmission Parameters (RTPs) associated with a control channel configuration based on at least two reference signals, and
if the triggered measurement event is a second type of measurement event, select a mapping converting a measurement result to a BLER which mapping assumes use of RTPs associated with the control channel configuration based on the at least one reference signal.

* * * * *